United States Patent
Ohara

(10) Patent No.: US 9,215,364 B2
(45) Date of Patent: Dec. 15, 2015

(54) FOCUS DETECTION APPARATUS, IMAGE PICKUP APPARATUS, IMAGE PICKUP SYSTEM AND FOCUS DETECTION METHOD

(71) Applicant: CANON KABUSHIKI KAISHA, Tokyo (JP)

(72) Inventor: Naoyuki Ohara, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 33 days.

(21) Appl. No.: 14/054,171

(22) Filed: Oct. 15, 2013

(65) Prior Publication Data

US 2014/0118610 A1 May 1, 2014

(30) Foreign Application Priority Data

Oct. 26, 2012 (JP) .................................. 2012-237009

(51) Int. Cl.
*H04N 5/232* (2006.01)
(52) U.S. Cl.
CPC .................................. *H04N 5/23212* (2013.01)
(58) Field of Classification Search
CPC . H04N 5/23212; H04N 5/243; H04N 5/3656; H04N 5/2356; G03B 3/00; G03B 3/02; G03B 3/04; G03B 3/06; G03B 3/10; G03B 3/12; G03B 13/32; G03B 13/34; G03B 13/36; G01C 3/32; G02B 7/04; G02B 7/09; G02B 7/10; G02B 7/102; G02B 7/105; G02B 7/28; G02B 7/285; G02B 7/287; G02B 7/30; G02B 7/305; G02B 7/34; G02B 7/343; G02B 7/346

USPC ......................................................... 348/349
See application file for complete search history.

(56) References Cited

U.S. PATENT DOCUMENTS

| 5,508,506 A * | 4/1996 | Kusaka .................... 250/201.8 |
| 7,233,359 B2 * | 6/2007 | Suda ............................ 348/349 |
| 7,474,352 B2 * | 1/2009 | Oikawa ....................... 348/349 |
| 7,924,342 B2 * | 4/2011 | Kusaka ........................ 348/345 |
| 8,223,256 B2 * | 7/2012 | Kusaka ......................... 348/349 |
| 8,754,976 B2 * | 6/2014 | Oikawa et al. ............... 348/345 |

(Continued)

FOREIGN PATENT DOCUMENTS

| JP | 2001-305415 A | 10/2001 |
| JP | 2007-121896 A | 5/2007 |

*Primary Examiner* — Pritham Prabhakher
(74) *Attorney, Agent, or Firm* — Cowan, Liebowitz & Latman, P.C.

(57) ABSTRACT

A focus detection apparatus which includes an image pickup element having first and second photoelectric conversion elements sharing a lens, wherein the first and second photoelectric conversion elements perform a photoelectric conversion of images passing through different exit pupils of an image pickup optical system so as to output a focus detection signal used for focusing by a phase difference detection method, the focus detection apparatus includes an image shift amount calculator which performs a correlation calculation by using each of signal values obtained independently from the first and second photoelectric conversion elements and calculate an image shift amount, a defocus amount calculator which calculates a defocus amount by multiplying the image shift amount by a coefficient, and a coefficient correcting portion which corrects the coefficient in accordance with the signal value obtained from the first photoelectric conversion element or the second photoelectric conversion element.

39 Claims, 10 Drawing Sheets

(56) References Cited

U.S. PATENT DOCUMENTS

| | | | |
|---|---|---|---|
| 2004/0125229 A1* | 7/2004 | Aoyama et al. | 348/345 |
| 2007/0269127 A1* | 11/2007 | Kusaka | 382/255 |
| 2008/0302947 A1* | 12/2008 | Utagawa | 250/201.8 |
| 2009/0167927 A1* | 7/2009 | Kusaka | 348/345 |
| 2009/0256952 A1* | 10/2009 | Kusaka | 348/349 |
| 2010/0045849 A1* | 2/2010 | Yamasaki | 348/349 |
| 2011/0096171 A1* | 4/2011 | Kimura | 348/187 |
| 2011/0205423 A1* | 8/2011 | Tsukada | 348/345 |

* cited by examiner

FOCUS DETECTION APPARATUS, IMAGE PICKUP APPARATUS, IMAGE PICKUP SYSTEM AND FOCUS DETECTION METHOD

BACKGROUND OF THE INVENTION

1. Field of the Invention

The present invention relates to a focus detection apparatus which is used for an image pickup apparatus such as a digital camera or a video camera.

2. Description of the Related Art

A phase difference detection method (hereinafter referred to as "a phase difference AF") is known as a method of an automatic focus (AF) method in an image pickup apparatus. In the phase difference AF, a light beam passing through an exit pupil of an image pickup lens is divided into two light beams, and the two divided light beams are respectively received by a pair of focus detection sensors. Then, a shift amount of signals outputted in accordance with the light receiving amount, that is, a relative position shift amount in a direction in which the light beam is divided (hereinafter referred to as "an image shift amount"), is detected, whereby a shift amount in the focusing direction of the image pickup lens (hereinafter referred to as "a defocus amount") is obtained.

Japanese Patent Laid-open No. 2001-305415 discloses a configuration in which an image pickup element is provided with a phase difference detection function, whereby a dedicated focus detection sensor is no longer needed, and a phase difference AF with high speed is realized. In the configuration of Japanese Patent Laid-open No. 2001-305415, a photoelectric converter of a pixel of the image pickup element is divided into two and is provided with a pupil dividing function. The outputs of the two divided photoelectric converters are separately processed to perform the focus detection. Further, the added output of the two divided photoelectric converters is used as an image pickup signal. Japanese Patent Laid-open No. 2007-121896 discloses calculating a conversion coefficient from the distribution of the focus detection optical system and the diameter information of the image pickup optical system, in consideration of a mechanical vignetting by an image pickup lens, whereby the focus detection accuracy may be improved.

However, the difference in the sensitivities of the two divided photoelectric converters is not considered in the configuration of Japanese Patent Laid-open No. 2001-305415. It is difficult to completely equalize the sensitivities of the respective photoelectric converters, and there may be cases where the output of one of the two divided photoelectric converters is saturated, whereas the other is not saturated, especially in an object bright enough for a pixel output (charge) to be saturated.

Accordingly, in order to obtain an accurate light amount, when the output of one of the photoelectric converters is saturated, it is necessary to leak such output to the other photoelectric converter. However, since the image shift amount is calculated by separately processing the output of the two divided photoelectric converters, the accuracy and speed of the focus detection may be influenced. Further, the configuration of Japanese Patent Laid-open No. 2007-121896 calculates the conversion coefficient based on information of the optical system from the image pickup lens to the focus to be detected, so as to improve the focus detection accuracy, although the leakage from the photoelectric converters is not considered.

BRIEF SUMMARY OF THE INVENTION

The present invention provides a focus detection apparatus, an image pickup apparatus, an image pickup system, and a focus detection method capable of focusing with high accuracy and at high speed.

A focus detection apparatus as one aspect of the present invention includes an image pickup element having a first photoelectric conversion element and a second photoelectric conversion element which share a lens, the first photoelectric conversion element and the second photoelectric conversion element perform a photoelectric conversion of images passing through different exit pupils of an image pickup optical system so as to output a focus detection signal used for focusing by a phase difference detection method, and the focus detection apparatus includes an image shift amount calculator configured to perform a correlation calculation by using each of signal values obtained independently from the first photoelectric conversion element and the second photoelectric conversion element respectively, and calculate an image shift amount, a defocus amount calculator configured to calculate a defocus amount by multiplying the image shift amount by a coefficient, and a coefficient correcting portion configured to correct the coefficient in accordance with the signal value obtained from the first photoelectric conversion element or the second photoelectric conversion element.

An image pickup apparatus as another aspect of the present invention includes the focus detection apparatus and an image processor configured to process an image signal obtained by using an addition signal of the first photoelectric conversion element and the second photoelectric conversion element.

An image pickup system as another aspect of the present invention includes an image pickup optical system and the image pickup apparatus configured to obtain an optical image via the image pickup optical system.

A focus detection method as another aspect of the present invention uses an image pickup element including a first photoelectric conversion element and a second photoelectric conversion element which share a lens, and the method includes the steps of performing a photoelectric conversion of images passing through different exit pupils of an image pickup optical system and outputting a focus detection signal used for focusing by a phase difference detection method by using the first photoelectric conversion element and the second photoelectric conversion element, performing a correlation calculation by using a signal value obtained independently from the first photoelectric conversion element and the second photoelectric conversion element respectively and calculating an image shift amount, calculating a defocus amount by multiplying the image shift amount by a coefficient, and correcting the coefficient in accordance with the signal value obtained from the first photoelectric conversion element or the second photoelectric conversion element.

Further features and aspects of the present invention will become apparent from the following description of exemplary embodiments with reference to the attached drawings.

DETAILED DESCRIPTION OF THE PREFERRED EMBODIMENTS

Figure 1:
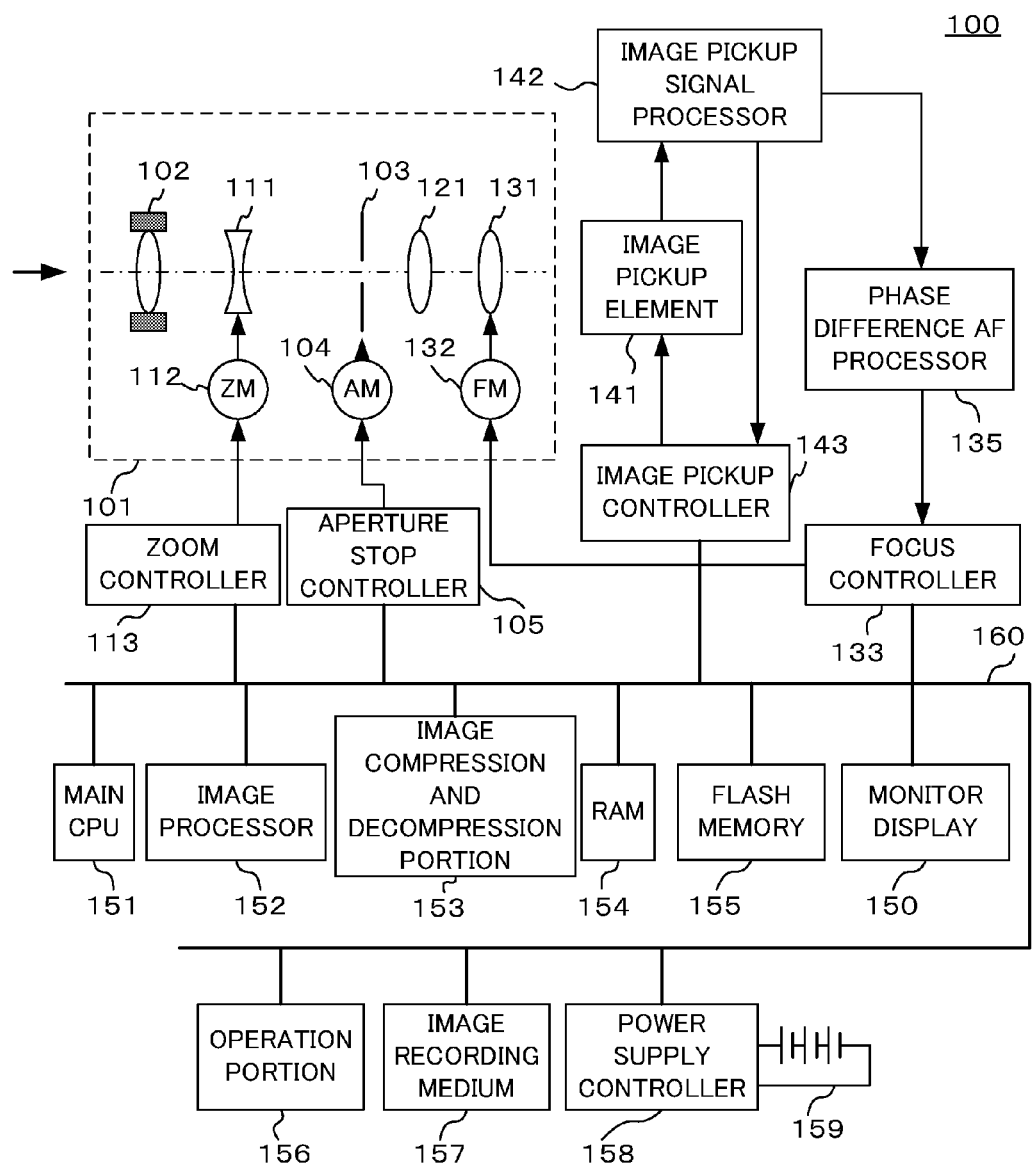
FIG. 1 is a block diagram of illustrating a configuration of an image pickup apparatus in each embodiment.

Exemplary embodiments of the present invention will be described below with reference to the accompanied drawings. In each of the drawings, the same elements will be denoted by the same reference numerals and the duplicate descriptions thereof will be omitted.

First of all, a configuration of an image pickup apparatus in the present embodiment is described. FIG. 1 is a block diagram of illustrating the configuration of an image pickup apparatus 100. The image pickup apparatus 100 is a video camera, a digital still camera, or the like, which takes an image of an object and is capable of recording data of a moving image or a still image on various media such as a tape, a solid-state memory, an optical disk, and magnetic disk, but the embodiment is not limited to this. Each unit of the image pickup apparatus 100 is connected to each other via a bus 160. Further, each unit is controlled by a main CPU (central processing unit) 151.

The image pickup apparatus 100 is provided with a focus detection apparatus which performs focus detection by a phase difference method, by using an image pickup element that includes a plurality of photoelectric conversion elements (a first photoelectric conversion element and a second photoelectric conversion element) sharing one micro lens. The focus detection apparatus of the present embodiment is applied to an image pickup system configured by including an image pickup apparatus (an image pickup apparatus body) configured to be capable of obtaining an optical image via an image pickup optical system (an image pickup lens), and an image pickup optical system detachable from the image pickup apparatus body. However, the present embodiment is not limited to the configuration, and can also be applied to an image pickup apparatus provided integrally with an image pickup optical system.

An image pickup lens 101 (a lens unit) is configured by including a fixed first lens unit 102, a zoom lens 111, an aperture stop 103, a fixed third lens unit 121, and a focus lens 131. An aperture stop controller 105 drives the aperture stop 103 through an aperture stop motor 104 in accordance with an instruction of the main CPU 151, whereby adjusts the opening diameter of the aperture stop 103, and perform adjustment of light amount at the time of taking an image. The zoom controller 113 changes the focal length by driving the zoom lens 111 via a zoom motor 112. Further, a focus controller 133 controls the focusing state by driving the focus lens 131 via a focus motor 132. The focus lens 131 is a lens for focusing, and is normally configured by a plurality of lenses, although illustrated simply by a single lens in FIG. 1.

An object image formed on the image pickup element 141 via these optical members (the image pickup lens 101) is converted into an electric signal by the image pickup element 141. The image pickup element 141 is a photoelectric conversion element which performs photoelectric conversion of the object image (an optical image) into the electric signal. As described below, two photoelectric conversion elements (light receiving areas) are disposed for each light receiving element of m pixels in the horizontal direction and n pixels in the vertical direction, in the image pickup element 141. An image formed on the image pickup element 141 and is subjected to photoelectric conversion is arranged as an image signal (image data) by an image pickup signal processor 142.

A phase difference AF processor 135 uses image signals (a signal value) outputted separately (independently) from two photoelectric conversion elements (a first photoelectric conversion element and a second photoelectric conversion element), and detects (calculates) an image shift amount of an image in a dividing direction obtained by dividing light from the object. That is to say, the phase difference AF processor 135 is an image shift amount calculator which performs a correlation calculation by using signal values obtained independently from the respective first photoelectric conversion element and the second photoelectric conversion element, and calculates the image shift amount. Further, the phase difference AF processor 135 is a defocus amount calculator which calculates a shift amount (a defocus amount) in the focusing direction of the image pickup lens 101 based on the detected image shift amount. The defocus amount is, as described below, calculated by multiplying the image shift amount by a coefficient (a conversion coefficient). The phase difference AF processor 135 includes, as described below, a coefficient correcting portion which corrects the coefficient in accordance with the signal values obtained from the first photoelectric conversion element and the second photoelectric conversion element. Each operation as the image shift amount calculator, the defocus amount calculator, and the coefficient correcting portion is performed based on the instruction of the main CPU 151. Further, at least a part of these operations may be configured to be performed by the main CPU 151 or the focus controller 133.

The phase difference AF processor 135 outputs the calculated shift amount (the defocus amount) to the focus controller 133. The focus controller 133 determines the drive amount by which the focus motor 132 is driven based on the shift amount in the focusing direction of the image pickup lens 101. The movement of the focus lens 131 is controlled by the focus controller 133 and the focus motor 132, whereby the AF control is realized.

The image data outputted from the image pickup signal processor 142 is transmitted to the image pickup controller 143, and is temporarily accumulated in a RAM (random access memory) 154. The image data accumulated in the RAM 154 is compressed by an image compression and decompression portion 153, and then is recorded in an image recording medium 157. In parallel with the processing, the image data accumulated in the RAM 154 is transmitted to an image processor 152. The image processor (image processing unit) 152 processes an image signal obtained by using addition signals of the first photoelectric conversion element and the second photoelectric conversion element. The image processor 152 performs, for example, reduction/magnification processing of image data into an optimal size. The image data subjected to processing into an optimal size is transmitted to a monitor display 150 so that an image is displayed. Accordingly, an operator can observe a shot image on a real-time basis. The monitor display 150 displays the shot image for a predetermined period immediately after the image is taken, whereby the operator can confirm the shot image.

An operation portion 156 (an operation switch) is used so that an operator performs instruction to the image pickup apparatus 100. An operation instruction signal inputted from the operation portion 156 is transmitted to the main CPU 151 via the bus 160. A battery 159 is suitably managed by a power supply controller 158, and performs stable power supply for the entire image pickup apparatus 100. A flash memory 155 stores control programs necessary to operate the image pickup apparatus 100. When the image pickup apparatus 100 is activated by an operation of an operator (when the image pickup apparatus 100 is changed from the power supply OFF state to the power supply ON state), the control program stored in the flash memory 155 is read (loaded) into a part of the RAM 154. The main CPU 151 controls the operation of the image pickup apparatus 100 in accordance with the control program loaded into the RAM 154.

Figure 2:
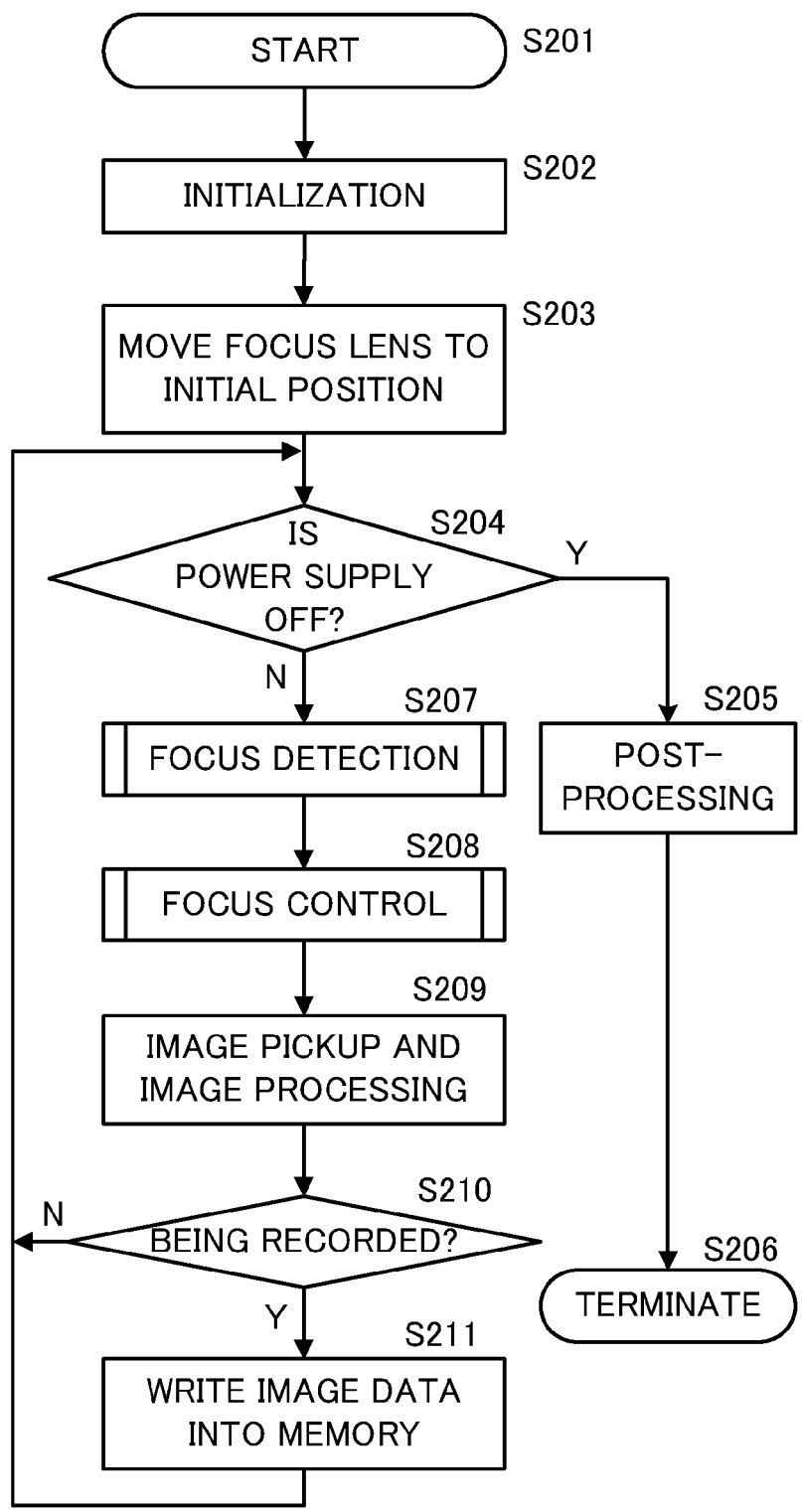
FIG. 2 is a flowchart of illustrating operations of the image pickup apparatus in each embodiment.

Next, referring to FIG. 2, operations including a focus control (the focusing) of the image pickup apparatus 100 are described. FIG. 2 is a flowchart of illustrating operations of the image pickup apparatus 100. Each step of FIG. 2 is performed based on the instruction of the main CPU 151.

First of all, in step S201, the main CPU 151 starts a calculation (control) when the power supply of the image pickup apparatus 100 is turned ON. Next, in step S202, flags, control variables, and the like of the image pickup apparatus 100 are initialized. Then, in step S203, optical members (image pickup optical members) such as the focus lens 131 are moved to initial positions.

Next, in step S204, the main CPU 151 detects whether or not the power supply OFF operation is performed by an operator (whether there is the power supply OFF operation). When the power supply OFF operation is detected in step S204, the flow proceeds to step S205. In step S205, the main CPU 151 moves the image pickup optical members to the initial position thereof, and performs post-processing such as clearing of various flags and control variables, so as to turn OFF the power supply of the image pickup apparatus 100. Then, in step S206, the processing (control) of the image pickup apparatus 100 is terminated.

On the other hand, when the power supply OFF operation is not detected in step S204, the flow proceeds to step S207. In step S207, the main CPU 151 performs the focus detection processing. Next, in step S208, the focus controller 133 drives the focus lens 131 in the drive direction, speed, and at a position determined in step S207, and moves the focus lens 131 to the desired position.

Next, in step S209, the image pickup element 141 performs the photoelectric conversion for an object image (image pickup processing). Further, the image pickup signal processor 142 performs predetermined processing (image processing) for the object image having been subjected to the photoelectric conversion, and outputs an image signal. Then, in step S210, the main CPU 151 detects whether or not a recording button (the operation portion 156) is pressed by an operator, and confirms whether the processing is being recorded. When the processing is not being recorded, the processing returns to step S204. On the other hand, when the processing is being recorded, the flow proceeds to step S211. In step S211, the image signal (image data) outputted from the image pickup signal processor 142 is subjected to compression processing by the image compression and decompression portion 153, and is recorded by the image recording medium 157. Then, the flow returns to step S204, and repeats the above described steps.

Figure 3A:
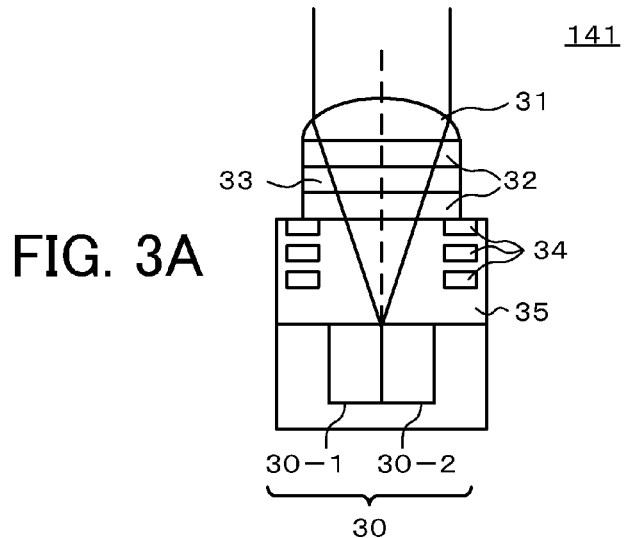
FIGS. 3A-3C are diagrams of describing an image pickup element in each embodiment.

Next, the phase difference detection method of the present embodiment is described. First of all, referring to FIGS. 3A-3C, the configuration of the image pickup element 141 is described. FIG. 3A is a configuration diagram (a cross-sectional diagram) of the image pickup element 141 which has a pupil dividing function. The photoelectric conversion element 30 has two photoelectric conversion elements divided into a photoelectric conversion element 30-1 (the first photoelectric conversion element) and a photoelectric conversion element 30-2 (the second photoelectric conversion element) for one pixel, and has a pupil dividing function. A micro lens 31 (an on-chip micro lens) has a function of efficiently focusing light to the photoelectric conversion elements 30, and is disposed so that the optical axis matches the border of the photoelectric conversion elements 30-1, 30-2. Further, a planarization film 32, a color filter 33, a wiring 34, and an interlayer dielectric film 35 are provided inside one pixel.

Figure 3B:
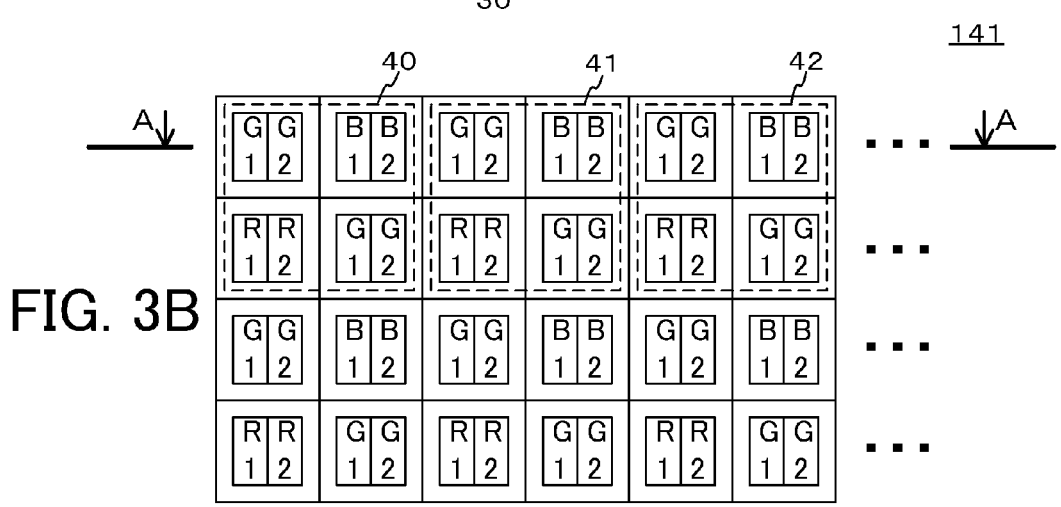

FIG. 3B is a configuration diagram (a plan view) of a part of the image pickup element 141. The image pickup element 141 is formed by disposing a plurality of pixels each having the configuration illustrated in FIG. 3A. Further, color filters 33 of R (red), G (green), and B (blue) are alternately disposed in each pixel, and pixel blocks 40, 41, and 42 each configured by four pixels are disposed, whereby a so-called Bayer array is configured so that the image pickup may be performed. Note that in FIG. 3B, "1" and "2" shown under each of R, G, and B respectively indicate values of the photoelectric conversion elements 30-1, and 30-2.

Figure 3C:
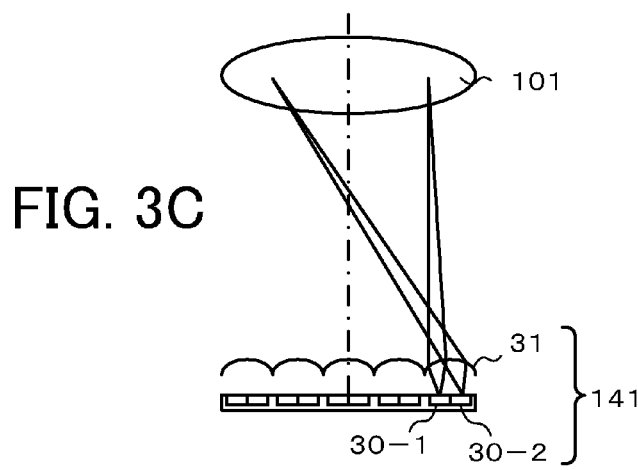

FIG. 3C is an optical principle diagram of the image pickup element 141, which illustrates a part of the cross-section diagram obtained by cutting the image pickup element 141 illustrated in FIG. 3B by the C-C line. The image pickup element 141 is disposed on a planned image forming plane of the image pickup lens 101. The photoelectric conversion elements 30-1, 30-2 are disposed so as to respectively receive a pair of light beams which have passed through different positions (areas) of the pupil (exit pupil) of the image pickup lens 101 by the micro lens 31. The photoelectric conversion element 30-1 receives, mainly the light beam passing through the right side position illustrated in FIG. 3C of the pupil of the image pickup lens 101. On the other hand, the photoelectric conversion element 30-2 receives, mainly the light beam passing through the left side position illustrated in FIG. 3C of the pupil of the image pickup lens 101.

Figure 4:
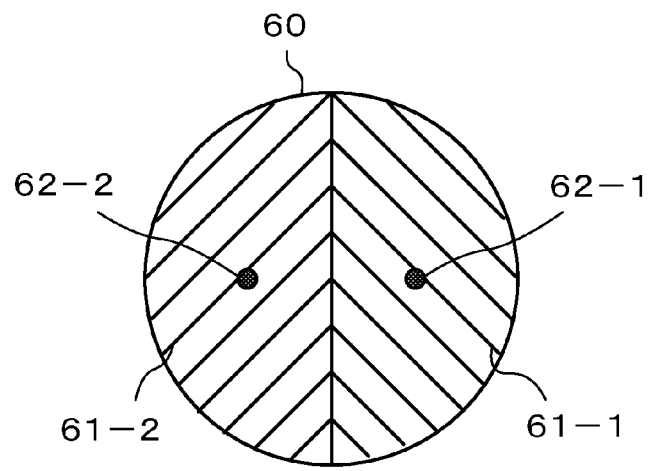
FIG. 4 is a view of illustrating a pupil of an image pickup lens in each embodiment.

Next, referring to FIG. 4, the pupil of the image pickup element 141 is described. FIG. 4 is a view of illustrating a pupil 60 of the image pickup lens 101 when viewed from the image pickup element 141. The reference number 61-1 represents a sensitivity area of the photoelectric conversion element 30-1 (hereinafter, referred to as "A image pupil"), and 61-2 represents a sensitivity area of the photoelectric conversion element 30-2 (hereinafter, referred to as "B image pupil"). The reference numbers 62-1, 62-2 respectively are gravity center positions of the A image pupil and B image pupil.

When the image pickup processing of the present embodiment is performed, the output of the two photoelectric conversion elements in which a color filter of the same color is disposed in the same pixel is added, whereby an image signal can be generated. On the other hand, when the focus detection processing of the present embodiment is performed, the output from the photoelectric conversion element corresponding to the photoelectric conversion element 30-1 in one pixel block is integrated, whereby the focus detection signal of one pixel is obtained. Then, such signals are sequentially obtained in the horizontal direction of the pixel blocks 40, 41, 42, and so on, whereby an A image signal can be generated. Similarly, the output from the photoelectric conversion element corresponding to the photoelectric conversion element 30-2 in one pixel block is integrated, whereby the focus detection signal of one pixel is obtained. Then, such signals are sequentially obtained in the horizontal direction, whereby a B image signal can be generated. A pair of phase difference detection signals are generated by the A image signal and B image signal. Lines may be added in the vertical direction illustrated in FIG. 3C in a suitable range when generating the focus detection signal of one pixel.

Figure 5:
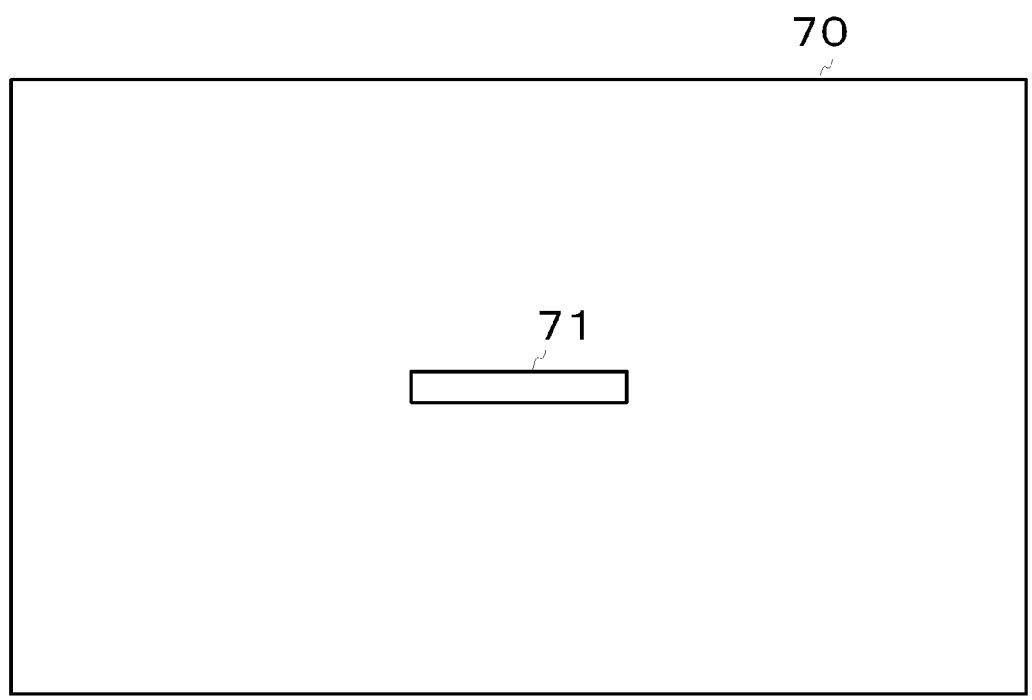
FIG. 5 is a view of illustrating a focus detection area in each embodiment.

Next, referring to FIG. 5, the focus detection area used in the focus detection method of the present embodiment is described. FIG. 5 is a view of illustrating the focus detection area. As illustrated in FIG. 5, a focus detection area 71 is provided at a suitable position for the image pickup field angle 70. The phase difference AF processor 135 generates the above described pair of phase difference detection signals for the focus detection area 71, and performs the focus detection. A plurality of focus detection areas may be set in the image pickup field angle 70. In the present embodiment, the method in which two photoelectric conversion elements are provided for the entire pixels configuring the image pickup element 141, and the phase difference detection signals are generated based on the focus detection area is described, but the present invention is not limited to this. For example, an image pickup element 141 including the configuration illustrated in FIG. 3A (divided pixel configuration) only in the focus detection area may be used.

Figure 6:
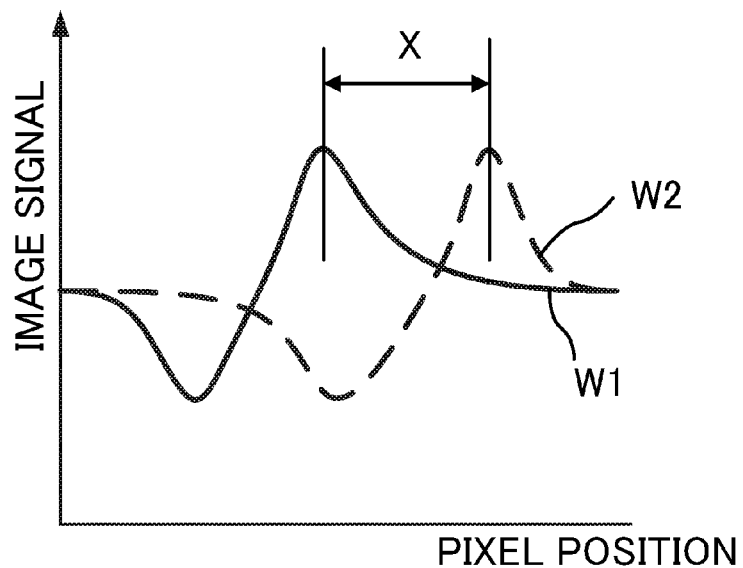
FIG. 6 is a diagram of illustrating an image signal in each embodiment.

Next, referring to FIG. 6, the A image signal and B image signal (which are collectively referred to as "image signals") are described. FIG. 6 is a diagram of illustrating the image signals. In FIG. 6, the vertical axis indicates the image signal level, and the horizontal axis indicates the pixel position. Further, the graphic curve W1 in FIG. 6 illustrates the A image signal, and the graphic curve W2 therein illustrates the B image signal. The image shift amount X of the pair of generated phase difference detection signals change in accordance with the image formation state (an in-focus state, a front-focus state, or a rear-focus state) of the image pickup lens 101. When the image pickup lens 101 is in the in-focus state, the image shift amount of the two image signals is none. On the other hand, when the image pickup lens 101 is in the front-focus state or in the rear-focus state, the image shift amount in different directions occurs. Further, the image shift amount has a certain relationship with the length between the position where an object image is formed by the image pickup lens 101 and the upper surface of the micro lens. Such length is a so-called defocus amount.

The main CPU 151 performs the correlation calculation for the two image signals (the A image signal and B image signal). In the correlation calculation, the main CPU 151 calculates a correlation value of the two image signals by shifting the pixels, and obtains the difference between the positions where the correlation value is maximized as the image shift amount. The main CPU 151 obtains the defocus amount of the image pickup lens 101 based on the calculated image shift amount, and calculates the lens drive amount so that the image pickup lens 101 is to be in the in-focus state, whereby the focusing is performed.

Figure 7A:
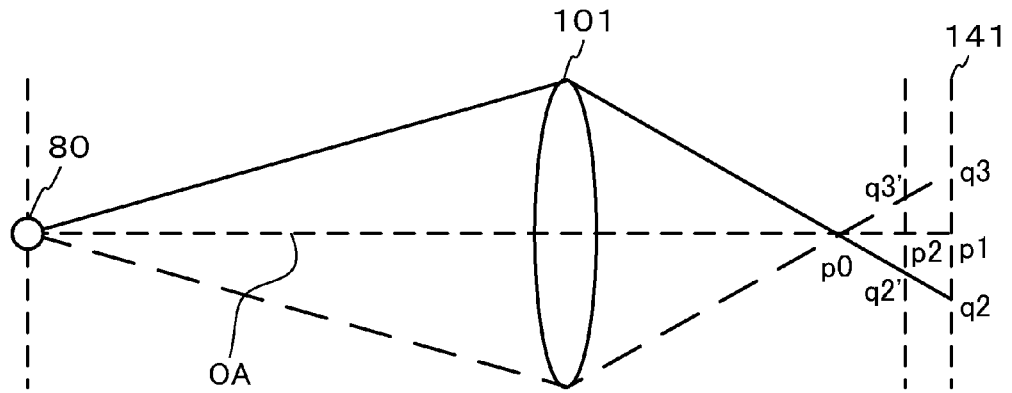
FIGS. 7A and 7B are diagrams of describing an optical system and the image signal in each embodiment.
Figure 7B:
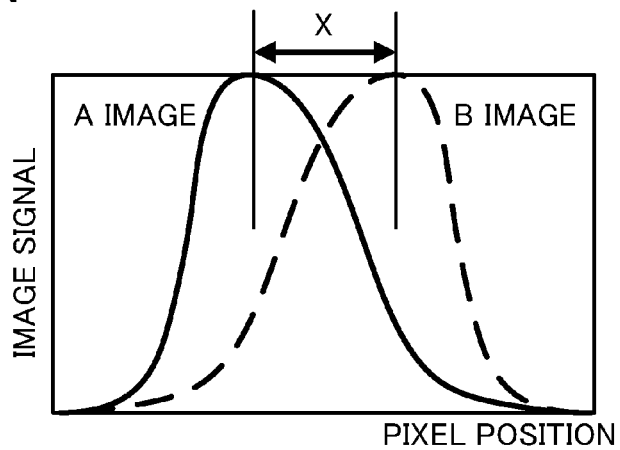

Subsequently, referring to FIGS. 7A and 7B, the conversion from the image shift amount calculated by the correlation calculation into the defocus amount is described. FIG. 7A is a view of illustrating the optical system including the image pickup lens 101 and the image pickup element 141. A position p1 of the focus detection plane is located on the optical axis OA extended from the position p0 of the planned image forming plane for the object 80. FIG. 7B illustrates the image signal at the position p1 of the focus detection plane. The relationship between the image shift amount and the defocus amount is determined according to the optical system. The defocus amount is calculated by multiplying the image shift amount X by a predetermined coefficient K (a conversion coefficient). The coefficient K is calculated based on the gravity center position of the A image pupil and B image pupil. When the position p1 of the focus detection plane is moved to position p2, the image shift amount changes in accordance with the similarity of the triangle formed by positions p0, q2, q3 and the triangle formed by positions p0, q2', q3'. Accordingly, it is possible to calculate the defocus amount at the position p2 of the focus detection plane. The main CPU 151 calculates the position of the focus lens 131 so as to obtain the in-focus state for the object based on the defocus amount.

Subsequently, the image pickup processing of the present embodiment is described. When the image pickup processing is performed, the output of the two photoelectric conversion elements in which the color filters of the same color are disposed in the same pixel are added, whereby an image signal is generated. The output of the photoelectric conversion element 30-1 and the output of the photoelectric conversion element 30-2 illustrated in FIG. 3A are added, whereby the output as the photoelectric conversion element 30 to be used for the image signal is obtained. It is difficult to completely equalize the sensitivities of the photoelectric conversion element 30-1 and photoelectric conversion element 30-2, and thus the sensitivities of the photoelectric conversion element 30-1 and photoelectric conversion element 30-2 are different from each other.

Figure 8:
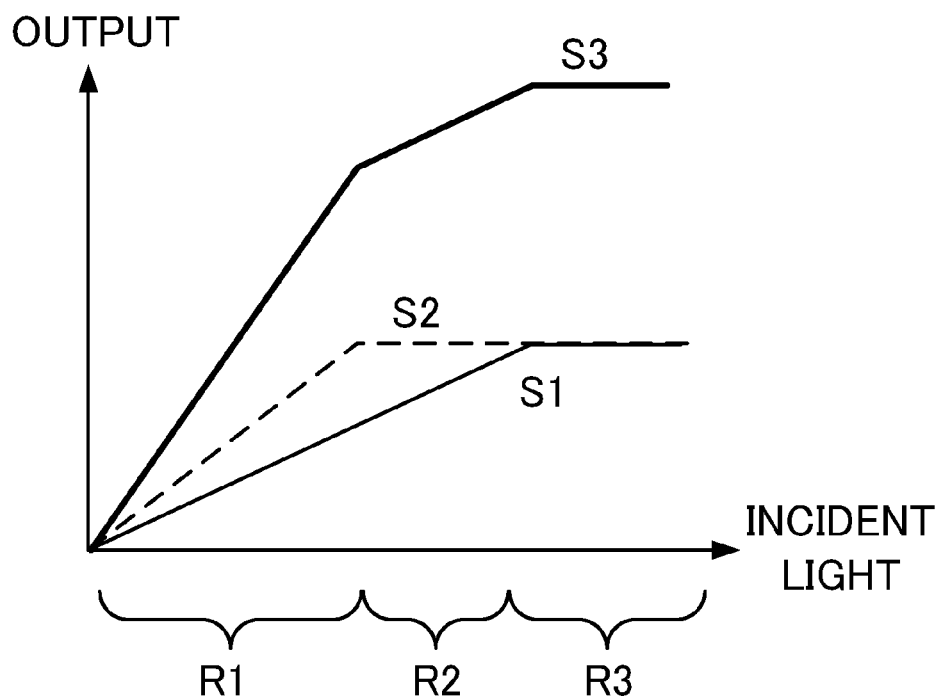
FIG. 8 is a view of illustrating a relationship between an output of a photoelectric converter and an incident light amount in each embodiment.

FIG. 8 is a view of illustrating the relationship between the output of the photoelectric conversion element 30 and the incident light from an object. In FIG. 8, the horizontal axis indicates the incident light amount from the object, and the vertical axis indicates the output of the photoelectric conversion element 30. In FIG. 8, S1 represents the output of the photoelectric conversion element 30-1 (the output of the A image signal), S2 represents the output of the photoelectric conversion element 30-2 (the output of the B image signal), and S3 represents the output obtained by adding the output of the photoelectric conversion element 30-1 and the output of the photoelectric conversion element 30-2 (the output of the image pickup signal). In a region R3 where both of the photoelectric conversion elements 30-1, 30-2 are saturated, the output of the image pickup signal may also be handled as being saturated. Further, in a region R1 where both of the photoelectric conversion elements 30-1, 30-2 are not saturated, the output of the image pickup signal can be linearly obtained in accordance with the incident light amount. On the other hand, in a region R2 where the photoelectric conversion element 30-1 is saturated, and the photoelectric conversion element 30-2 is not saturated, the output of the image pickup signal cannot be linearly obtained in accordance with the incident light amount, due to the photoelectric conversion element 30-1 being saturated.

Therefore, the image pickup element 141 of the present embodiment is configured so that, when the output of one photoelectric conversion element reaches a predetermined amount or more within a degree of not being saturated, the charge generated in such photoelectric conversion element leaks into the other photoelectric conversion element sharing one micro lens 31. By such configuration, even when one photoelectric conversion element is in a saturated state, the output of the image pickup signal obtained by adding the output of the two photoelectric conversion elements can be obtained linearly in accordance with the incident light amount, whereby the influence to an image may be reduced.

However, when the charge generated in the photoelectric conversion element 30-1 is leaked into photoelectric conversion element 30-2, the focus detection is influenced in which the image shift amount of the A image signal and B image signal outputted independently from each of the photoelectric conversion elements is obtained. Therefore, it is necessary to reduce such influence.

Figure 9:
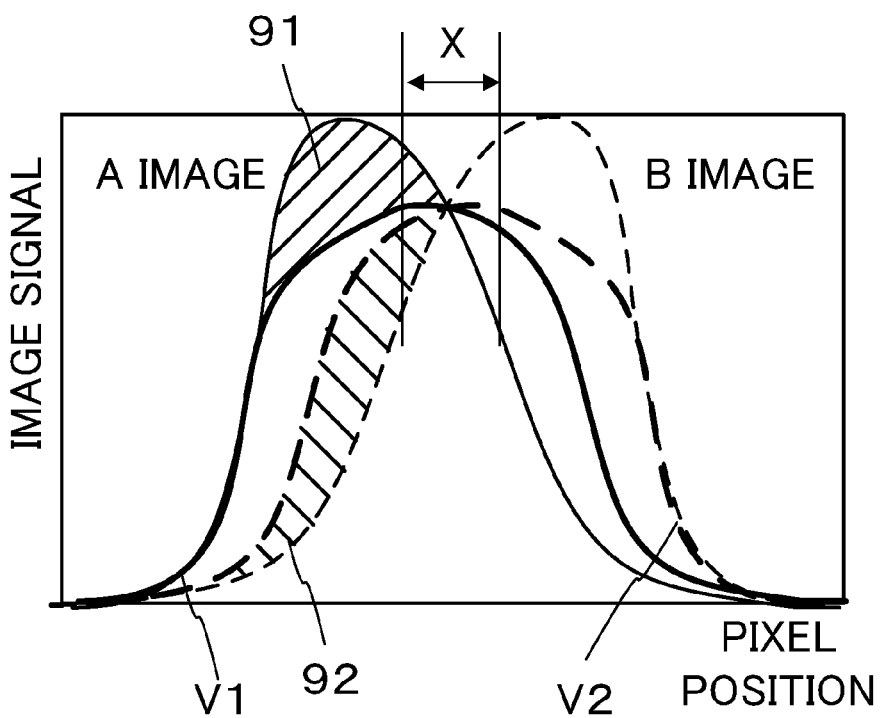
FIG. 9 is a view of illustrating an image signal when charge leakage of the photoelectric conversion element occurs in each embodiment.

FIG. 9 is a view of illustrating the image signal when charge leaks from the photoelectric conversion element 30-1 into photoelectric conversion element 30-2. As illustrated in FIG. 9, the charge in an area 91 of high luminance leaks into the other photoelectric conversion element, whereby moves to a region 92. As a result of the charge leakage, the A image signal and B image signal for the focus detection are represented by V1 and V2, and the image shift amount X to be detected is smaller than an image shift amount before the charge leakage occurs.

Figure 10:
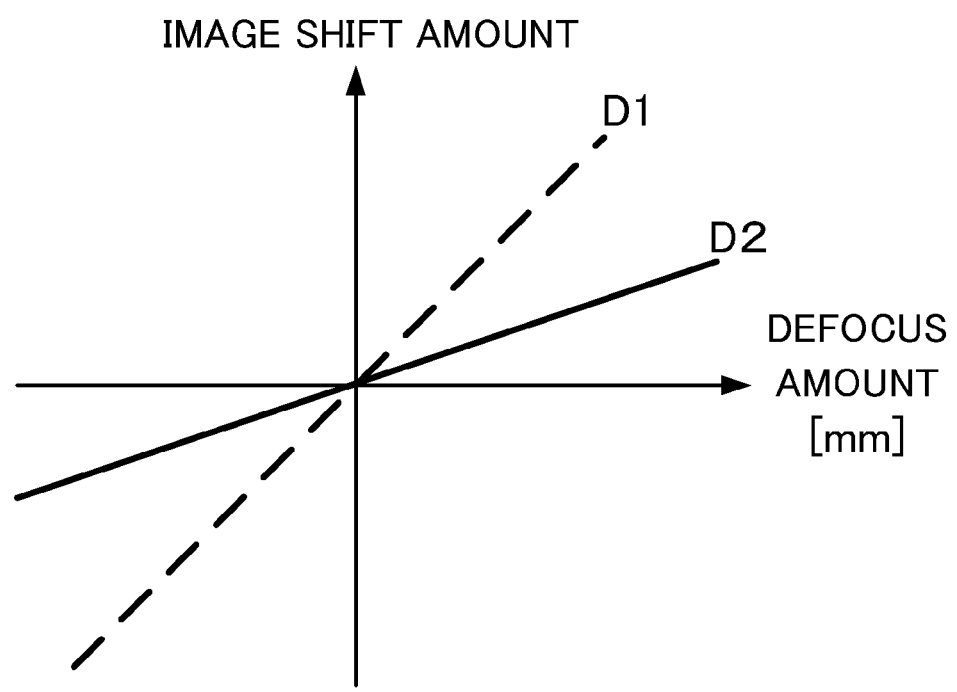
FIG. 10 is a view of illustrating a relationship between a defocus amount and an image shift amount in each embodiment.

FIG. 10 is a view of illustrating the relationship between the image shift amount X detected by the focus detection apparatus and the defocus amount when the focus is shifted from the in-focus position. In FIG. 10, the vertical axis indicates the detected image shift amount, and the horizontal axis indicates the defocus amount. D1 represents the image shift amount when the charge leakage of the photoelectric conversion element does not occur, and D2 represents the image shift amount when the charge leakage occurs. When the charge leakage does not occur, the defocus amount can be calculated by multiplying the detected image shift amount X by a coefficient K (the conversion coefficient) determined in accordance with the optical system.

However, when the charge leakage occurs, the image shift amount is detected as a smaller amount, whereby the defocus amount is also detected as a value smaller than the actual value. Accordingly, when the image shift amount is detected to be smaller due to the charge leakage, the coefficient K (the conversion coefficient) used when calculating the defocus amount from the image shift amount X is corrected in accordance with the degree of the charge leakage, in order to approximate the detected defocus amount to the actual defocus amount. The larger the output obtained from the photoelectric conversion element, the more greatly the charge leakage occurs. Therefore, it is possible to calculate the correction value for the coefficient K, based on an accumulation value of luminance values being a predetermined value or more of the A image signal and B image signal.

Figure 11:
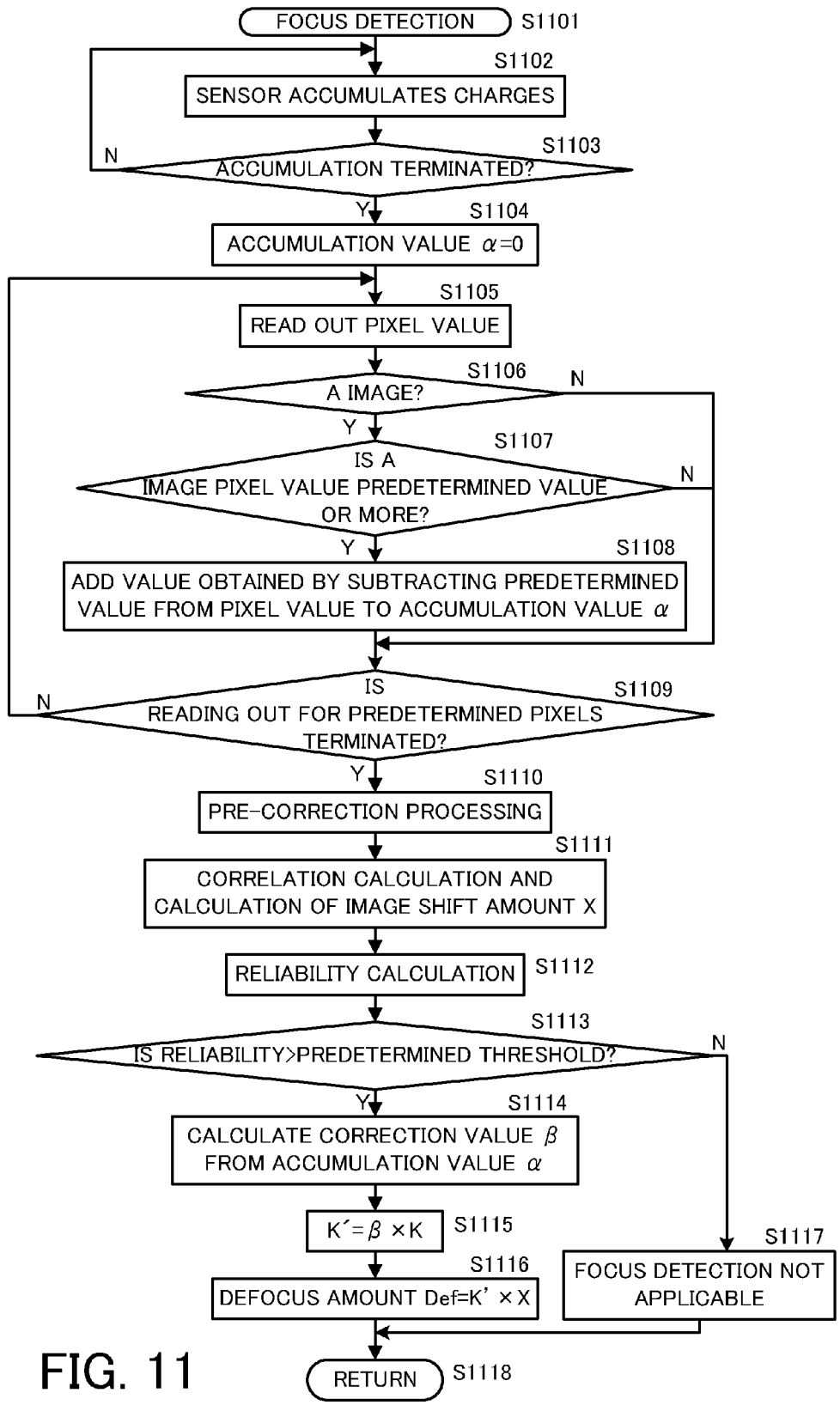
FIG. 11 is a flowchart of illustrating a focus detection method in each embodiment.

FIG. 11 is a flowchart of illustrating the focus detection method in the present embodiment. Each step of FIG. 11 is executed by the main CPU 151, the phase difference AF processor 135, and the focus controller 133, which corresponds to step S207 of FIG. 2.

First of all, in step S1101, the focus detection is started. Subsequently, in step S1102, the image pickup element 141 accumulates charges. Then, in step S1103, the main CPU 151 determines whether or not the charge accumulation is terminated. When the charge accumulation termination time of the image pickup element 141 is not reached, the flow returns to step S1102, and the image pickup element 141 continues the charge accumulation. On the other hand, in step S1103, when the charge accumulation is terminated, the accumulation value α related to the current focus detection is initialized in step S1104.

Subsequently, in step S1105, the reading out of the pixel value of the image signal in the focus detection area 71 illustrated in FIG. 5 is performed. Then, in step S1106, the main CPU 151 (the focus controller 133 or the phase difference AF processor 135) determines whether or not the reading out of the pixel value is that of the A image signal. When the reading out is not directed to the A image signal, the flow proceeds to step S1109. On the other hand, when the reading out is directed to the A image signal, in step S1107, the main CPU 151 (the focus controller 133 or the phase difference AF processor 135) determines whether or not the pixel value (the A image pixel value) is predetermined value or more. As described above, the main CPU 151 (the focus controller 133 or the phase difference AF processor 135) is a signal determining portion which determines whether or not a plurality of signal values obtained from a plurality of the first photoelectric conversion elements or a plurality of the second photoelectric conversion elements are predetermined value or more.

In step S1107, when the pixel value is predetermined value or more, the signal determining portion adds a value based on the signal values of the predetermined value or more among the plurality of signal values, whereby calculates (updates) the accumulation value, in step S1108. The signal determining portion of the present embodiment adds the value obtained by subtracting a predetermined value from the read out pixel value (the signal values of the predetermined value or more), whereby calculates (updates) the accumulation value α (α=α+(pixel value−predetermined value). Then, the flow proceeds to step S1109.

On the other hand, when the pixel value is less than the predetermined value in step S1107, the flow proceeds to step S1109. In step S1109, the main CPU 151 determines whether or not the reading out of the predetermined number of pixels in the focus detection area 71 is terminated. When the reading out of the predetermined number of pixels is not terminated, the flow returns to step S1105, and steps S1105-S1108 are repeated until the reading out of the predetermined number of pixels is terminated.

Subsequently, in step S1110, the focus controller 133 performs pre-correction processing for the obtained image signals. Such pre-correction processing includes correction processing for the read out image signals, and filter processing of the image signals such as an averaging filtering, an edge emphasis filtering, and the like. Then, in step S1111, the main CPU 151 (the focus controller 133 or the phase difference AF processor 135) performs the correlation calculation, and calculates the shift amount in which the correlation is maximized. In the correlation calculation, the correlation value is calculated while shifting the pixels of the A image signal and B image signal in the focus detection area 71, whereby the difference between the positions where the correlation value is maximized is calculated as the image shift amount.

When calculating the correlation value, the two image signals are overlapped with each other, the corresponding signals are compared, whereby the accumulation of the smaller values is obtained. The accumulation of the larger values may alternatively be obtained. Further, the difference between such values may be obtained as well. The accumulation is to be an index that indicates the correlation, and in the case where the accumulation of the smaller values is obtained, the correlation is high when such value is maximized. Note that in the case where the accumulation of the larger values is obtained, or the difference is obtained, the correlation is high when such value is minimized. After the shift amount in which the correlation is maximized is calculated, an interpolation calculation is performed by using the correlation values of such shift amount and the anterior and posterior shift amounts, whereby the interpolation value within one shift is calculated. The sum of such shift amount and the interpolation value is the image shift amount X. As described above, the main CPU 151, the focus controller 133, or the phase difference AF processor 135 as the image shift amount calculator performs the correlation calculation by using the signal values obtained independently from the respective first photoelectric conversion element and the second photoelectric conversion element, whereby obtains the image shift amount.

Next, in step S1112, the main CPU 151 (the focus controller 133 or the phase difference AF processor 135) evaluates the reliability of the calculated image shift amount X. Such reliability is calculated based on the contrast of the image signals, the matching degree of the two image signals, and the like. Then, in step S1113, the focus controller 133 evaluates the calculated reliability. When the reliability is high with respect to the predetermined threshold, the image shift amount X is evaluated as being sufficiently reliable. On the other hand, when the reliability is low with respect to the predetermined threshold, the image shift amount X is evaluated as being unreliable.

Figure 12:
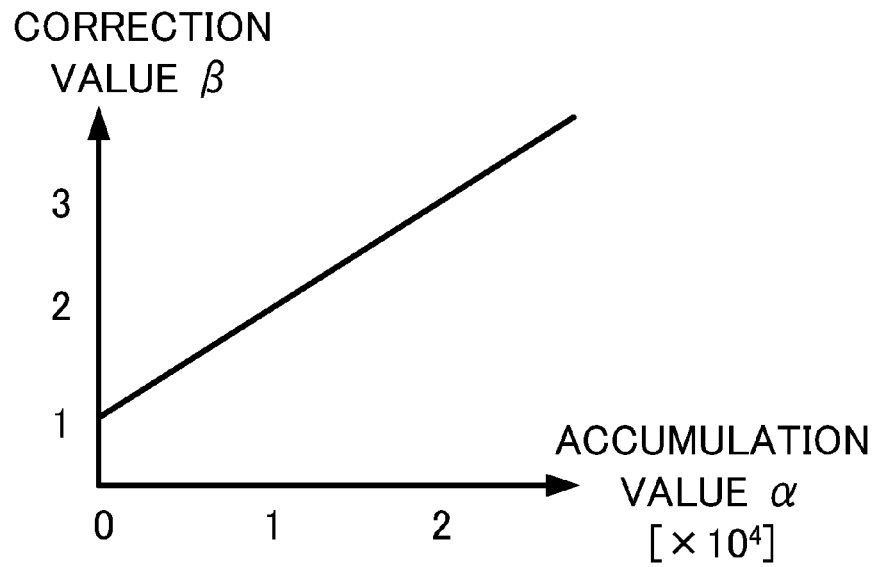
FIG. 12 is a view of illustrating a relationship between a correction value β and an accumulation value α in each embodiment.

Next, in step S1113, the main CPU 151 (the focus controller 133 or the phase difference AF processor 135) determines whether or not the reliability is larger than the predetermined threshold (whether or not a reliable image shift amount X is obtained). When the reliability is larger than the predetermined threshold, in step S1114, the main CPU 151 (the focus controller 133 or the phase difference AF processor 135) obtains the correction value $\beta$ (the correction coefficient) of the coefficient K so as to calculate the defocus amount from the image shift amount X. FIG. 12 is a view showing the relationship between the correction value $\beta$ and the accumulation value $\alpha$. When the accumulation value $\alpha$ is 0, the correction value $\beta$ is set to be 1. As the accumulation value $\alpha$ is increased, the correction value $\beta$ is increased. In the present embodiment, the correction value $\beta$ is obtained by using a relative equation of $\beta = 0.0001 \times \alpha + 1$. That is to say, the coefficient correction portion calculates the correction coefficient (the correction value $\beta$) by using the value obtained by multiplying the accumulation value $\alpha$ by the predetermined ratio (0.0001 in the present embodiment).

Next, in step S1115, the main CPU 151 (the focus controller 133 or the phase difference AF processor 135) corrects the coefficient K. The corrected coefficient K' is obtained by a relative equation of $K' = \beta \times K$ by using the correction value $\beta$. As described above, the main CPU 151 (the focus controller 133 or the phase difference AF processor 135) is the coefficient correcting portion which corrects the coefficient K according to the signal values obtained by the first photoelectric conversion element and the second photoelectric conversion element. For example, the coefficient correcting portion of the present embodiment corrects the coefficient K so that the coefficient K increases as the signal value obtained from the first photoelectric conversion element or the second photoelectric conversion element is increased. To be more specific, the coefficient correcting portion of the present embodiment corrects the coefficient K so that the coefficient K increases as the accumulation value based on the plurality of signal values obtained from the plurality of first photoelectric conversion elements or the plurality of second photoelectric conversion elements in the focus detection area is increased.

Next, in step S1116, the main CPU 151 (the focus controller 133 or the phase difference AF processor 135) multiplies the calculated image shift amount X by the corrected coefficient K', whereby calculates the defocus amount Def (by the relative equation of $Def = K' \times X$).

Then, in step S1118, the focus detection processing illustrated in the flow is terminated. On the other hand, when the reliability is the predetermined threshold or less in step S1113 (when a reliable image shift amount cannot be detected), the focus detection is not performed (the focus detection is not applicable). Then, in step S1118, the processing of the flow is terminated.

[Embodiment 1]

Figure 13:
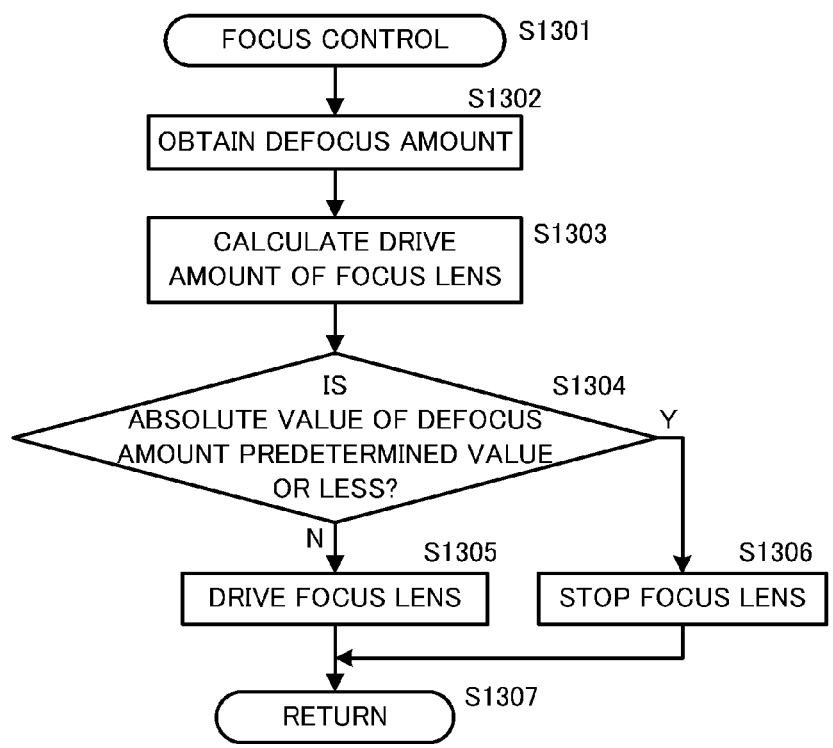
FIG. 13 is a flowchart of illustrating a focus control method in Embodiment 1.

Next, referring to FIG. 13, a focus control method (a focusing method) in Embodiment 1 of the present invention is described. FIG. 13 is a flowchart of illustrating the focus control method of the present embodiment. When the focus control method of the present embodiment is started, the main CPU 151 performs the predetermined calculation. Then, the focus controller 133 performs the control of the focus motor 132 based on the instruction of the main CPU 151. Each step illustrated in FIG. 13 is executed by the main CPU 151 and the focus controller 133, and corresponds to step S208 illustrated in FIG. 2.

First of all, when the focus control is started in step S1301, the focus controller 133 obtains the defocus amount calculated by the focus detection method illustrated in FIG. 11 in step S1302. Then, in step S1303, the focus controller 133 calculates the drive amount of the focus lens 131 (the lens drive amount) based on the defocus amount. Further, the calculation of the lens drive amount includes the calculation of the lens drive direction and speed. Subsequently, in step S1304, the main CPU 151 (the focus controller 133) determines whether or not the absolute value of the defocus amount is the predetermined value or less. As described above, the main CPU 151 (the focus controller 133) is an in-focus determining portion which performs an in-focus determination based on the absolute value of the defocus amount.

In step S1304, when the absolute value of the defocus amount is not the determined value or less, the processing proceeds to the step S1305. In step S1305, since the position of the focus lens 131 is regarded as not being the focusing position (the in-focus point), the focus lens 131 is driven in accordance with the lens drive amount calculated in step S1303, and the processing proceeds to step S1307. Thereafter, the focus detection and the focus lens drive are repeated in accordance with the flow illustrated in FIG. 2.

On the other hand, in step S1304, when the absolute value of the defocus amount is the determined value or less, the processing proceeds to step S1306. Here, since the position of the focus lens 131 is regarded as being at the in-focus point, the lens drive is stopped in step S1306, and the flow proceeds to step S1307. Thereafter, the focus detection is performed according to the flow illustrated in FIG. 2. When the defocus amount exceeds the predetermined value again, the focus lens 131 is driven.

As described above, in a focus detection apparatus capable of image pickup and focus detection by using two divided photoelectric converters, when the output of one of the photoelectric conversion elements is large, charge which occurs in such photoelectric conversion element is leaked into the other photoelectric conversion element sharing one micro lens 31. Accordingly, even when one photoelectric conversion element is saturated, the output of image pickup signals obtained by adding the outputs of the two photoelectric conversion elements can be obtained linearly according to the incident light amount. Further, the changes in the image shift amount in the focus detection due to the charge leakage is corrected when converting the image shift amount into the defocus amount according to the magnitude of image signals. Accordingly, the detected defocus amount can be approximated to the actual defocus amount, whereby the in-focus accuracy can be improved. In addition, the number of times of focus detection until reaching the in-focus state can be reduced, whereby the focusing can be speeded up.

[Embodiment 2]

Next, a focus control method (a focusing method) in Embodiment 2 of the present invention is described. In Embodiment 1, the focus control method in which the coefficient K to calculate the defocus amount from the detected image shift amount X is changed based on the magnitude of the image signals is described. The detected defocus amount is approximated to the actual defocus amount, and the number of times of focus detection until reaching the in-focus state is reduced, whereby the focusing can be speeded up. On the other hand, in the present embodiment, a focus control method in which the focus lens is driven to a position nearer to the in-focus position is described. In the present embodiment, the same reference number of allotted to the equivalent in Embodiment 1, and the description thereof will be omitted.

Figure 14:
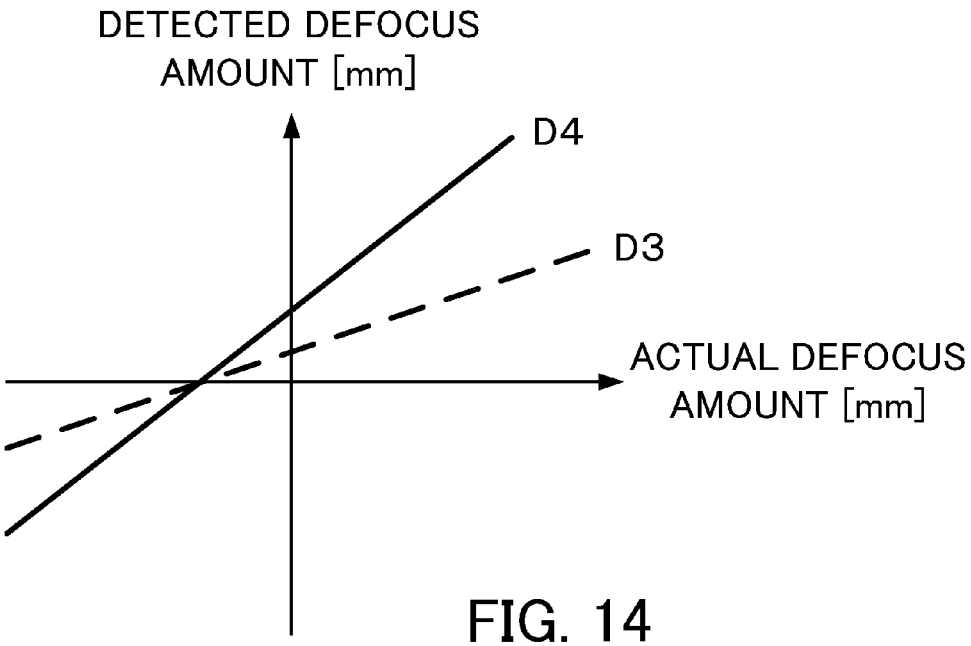
FIG. 14 is a view of illustrating a relationship between an actual defocus amount and a detected defocus amount in Embodiment 2.

FIG. 14 is a view of illustrating the relationship between the actual defocus amount when shifted from the in-focus position, and the defocus amount detected by a focus detection apparatus. D3 represents the detected defocus amount when the coefficient K (the conversion coefficient) is not corrected, and D4 represents the detected defocus amount when the coefficient K is corrected in accordance with the method of Embodiment 1. Since the coefficient K is multiplied by the correction value β, the detected defocus amount at the in-focus position where the actual defocus amount is 0 includes error in accordance with the correction value β.

Further, in step S1304 illustrated in FIG. 13, the determination of whether or not the position of the focus lens 131 is moved to the in-focus position is performed by determining whether or not the absolute value of the detected defocus amount is the predetermined value or less. Such determination is performed so as to prevent the focus lens 131 from being continuously driven by a slight defocus amount detected once the focus lens 131 reached the in-focus state. However, in the case where the error at the in-focus position increases due to multiplying the correction value β, such error remains as it is when the focus lens 131 is moved to the in-focus position. In accordance with the present embodiment, the focus control method (the focusing method) capable of moving the focus lens 131 to a position nearer to the in-focus position is described.

Figure 15:
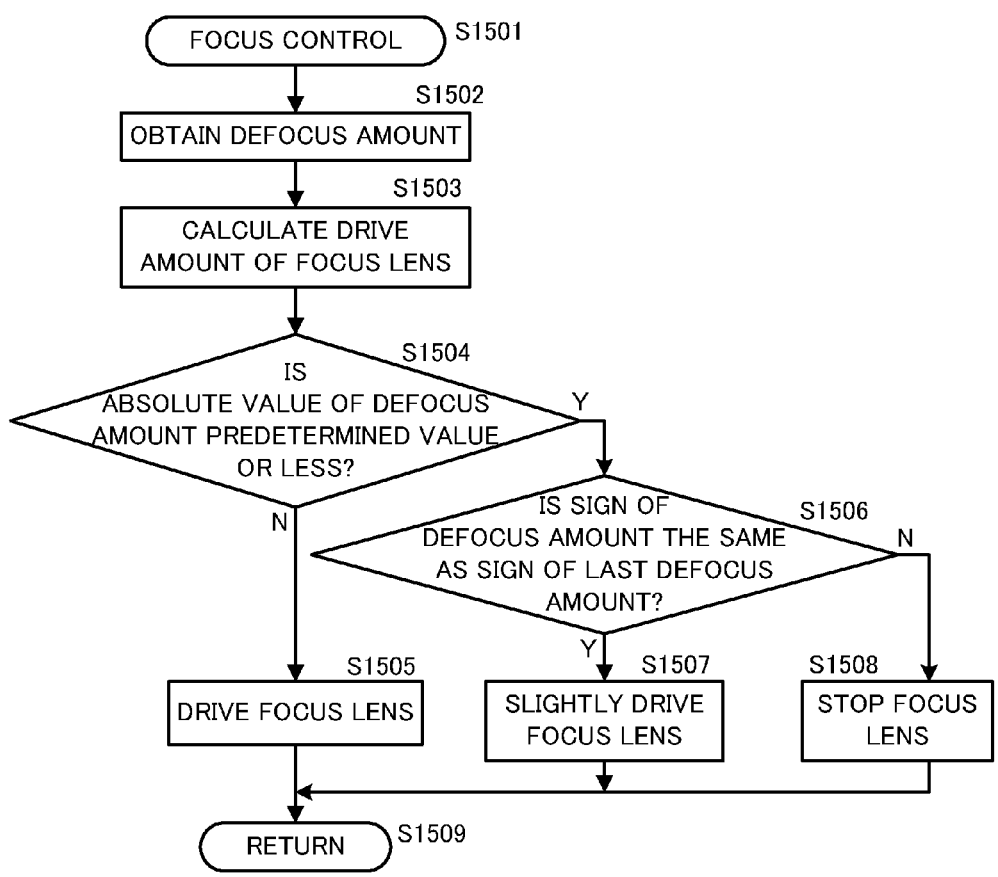
FIG. 15 is a flowchart of illustrating a focus control method in Embodiment 2.

FIG. 15 is a flowchart of illustrating the focus control method of the present embodiment. In FIG. 15, steps S1501-1505 respectively are the same as steps S1301-S1305 in Embodiment 1 described with reference to FIG. 13. In step S1504, when the absolute value of the defocus amount is the predetermined value or less, in step S1506, the main CPU 151 (the focus controller 133) determines whether or not the sign of the currently detected defocus amount matches the sign of the last detected defocus amount. When the signs match, since the position of the focus lens 131 is not regarded as being at the focusing position (the in-focus point), in step S1507, the focus lens 131 is slightly driven to the lens drive direction calculated in step S1503. Here, the lens drive speed may be lowered. This is to prevent the focus lens 131 from greatly exceeding the in-focus position, since the position of the focus lens 131 is already in the vicinity of the in-focus position.

On the other hand, in step S1506, when the signs of the defocus amount do not match, in step S1508, the position of the focus lens 131 is regarded as being at the focusing position (the in-focus point), and the driving of the lens is stopped. As described above, the main CPU 151 (the focus controller 133) is an in-focus determining portion which determines the state where the sign of the defocus amount is reversed from that of the last defocus amount to be the in-focus state.

In the present embodiment, the switching of the positions where the in-focus position is located this time and the last time may be confirmed (determined) by whether there is a reverse in the signs of the current and last defocus amount. By performing the correction when calculating the defocus amount from the detected image shift amount X, the focus lens can be moved rapidly to the vicinity of the in-focus position. Further, by confirming the reverse in the signs of the defocus amount, the focus lens can be lead to the in-focus position.

As described above, in the present embodiment, not only by correcting the changes in the image shift amount due to the charge leakage in the focus detection as described in Embodiment 1, but also by confirming the in-focus position by the reverse in the signs of the defocus amount, the focus lens can be driven to a position nearer to the in-focus position.

In each of the embodiments described above, the accumulation value of luminance values (the signal values) of the A image signal being a predetermined value or more is calculated, whereby the correction value is calculated, but the present invention is not limited to this. For example, the correction value maybe calculated by using the maximum values of the A image signal. In this case, the signal determining portion determines the maximum value of the plurality of signal values obtained from the plurality of the first photoelectric conversion elements or the plurality of the second photoelectric conversion elements in the focus detection area. Then, the coefficient correcting portion corrects the coefficient K so that the coefficient K increases as the maximum value is increased.

Further, a correction value may be calculated by using the number of pixels in the A image signal larger than the predetermined value. In this case, the signal determining portion determines whether or not the plurality of signal values obtained from the plurality of the first photoelectric conversion elements or the plurality of the second photoelectric conversion elements in the focus detection area are the predetermined value or more, and calculates the number of pixels indicating the signal value being the predetermined value or more. Then, the coefficient correcting portion corrects the coefficient K so that the coefficient K increases as the number of the pixels is increased.

Alternatively, the average value of the accumulation value of luminance values (the signal values) of the A image signal being a predetermined value or more and the number of pixels may be calculated, and the correction value may be calculated for such average value. In this case, the signal determining portion adds the value of the signal values being the predetermined value or more among the plurality of signal values, whereby the accumulation value, and the number of pixels indicating the signal values being the predetermined value or more are calculated. Then, the coefficient correcting portion corrects the coefficient K so that the coefficient K increases as the average value of the accumulation value and the number of the pixels is increased.

According to each of the embodiments described above, even when one of the two divided photoelectric conversion elements is saturated, the output of image pickup signals obtained by adding the outputs of the two photoelectric conversion elements can be obtained linearly in accordance with the incident light amount. Further, the focus detection accuracy when charge leakage occurs can be improved. In addition, the number of focus detection times until reaching the in-focus state can be reduced. Thus, according to each of the embodiments described above, a focus detection apparatus, an image pickup apparatus, an image pickup system and a focus detection method capable of focusing with high accuracy and at high speed can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, in each of the embodiments described above, the charge leakage amount is calculated by determining whether or not the A image signal is larger than the predetermined value, but the present invention is not limited this and the determination may be performed for the B image signal in the same manner.

This application claims the benefit of Japanese Patent Application No. 2012-237009, filed on Oct. 26, 2012, which is hereby incorporated by reference herein in its entirety.

What is claimed is:

1. A focus detection apparatus which includes an image pickup element having a first photoelectric conversion element and a second photoelectric conversion element which share a lens, wherein the first photoelectric conversion element and the second photoelectric conversion element perform a photoelectric conversion of images passing through different exit pupils of an image pickup optical system so as to output a focus detection signal used for focusing by a phase difference detection method, the focus detection apparatus comprising:
a processor performing a correlation calculation by using each of signal values obtained from the first photoelectric conversion element and the second photoelectric conversion element respectively, and calculating an image shift amount;
the processor performing a calculation of a defocus amount by multiplying the image shift amount by a coefficient;
the processor performing correction of the coefficient in accordance with the signal value obtained from at least one of the first photoelectric conversion element and the second photoelectric conversion element; and
the processor determining a maximum value of the plurality of signal values obtained from at least one of the plurality of first photoelectric conversion elements and the plurality of second photoelectric conversion elements in a focus detection area,
wherein the processor corrects, when the signal value obtained from at least one of the first photoelectric conversion element and the second photoelectric conversion element is greater than a predetermined value, the coefficient so that the coefficient increases, compared with a case where the signal value is less than or equal to the predetermined value, and
wherein the processor corrects the coefficient so that the coefficient increases as the maximum value is increased.

2. The focus detection apparatus according to claim 1, wherein the processor corrects the coefficient so that the coefficient increases as the signal value obtained from at least one of the first photoelectric conversion element and the second photoelectric conversion element is increased.

3. The focus detection apparatus according to claim 1, wherein the processor determines whether or not the plurality of signal values obtained from at least one of the plurality of first photoelectric conversion elements and the plurality of second photoelectric conversion elements in a focus detection area are not less than a predetermined value,
wherein the processor calculates the number of pixels indicating a signal value not less than the predetermined value, and
wherein the processor corrects the coefficient so that the coefficient increases as the number of the pixels is increased.

4. The focus detection apparatus according to claim 1, wherein the processor determines whether or not the plurality of signal values obtained from at least one of the plurality of first photoelectric conversion elements and the plurality of second photoelectric conversion elements in a focus detection area are not less than a predetermined value,
wherein the processor calculates an accumulation value by adding a value based on a signal value not less than the predetermined value of the plurality of signal values, and calculates the number of pixels indicating the signal value not less than the predetermined value, and
wherein the processor corrects the coefficient so that the coefficient increases as an average value of the accumulation value and the number of pixels is increased.

5. The focus detection apparatus according to claim 1, wherein the processor performs an in-focus determination based on an absolute value of the defocus amount,
wherein the processor determines an in-focus state when a lens drive direction is reversed from a direction of a last lens drive direction.

6. An image pickup apparatus comprising:
a focus detection apparatus according to claim 1; and
an image processor configured to process an image signal obtained by using an addition signal of the first photoelectric conversion element and the second photoelectric conversion element.

7. An image pickup system comprising:
an image pickup optical system; and
an image pickup apparatus according to claim 6, configured to obtain an optical image via the image pickup optical system.

8. The image pickup system according to claim 7, wherein the first photoelectric conversion element and the second photoelectric conversion element are configured to receive a pair of light beams passing through different regions of an exit pupil of the image pickup optical system.

9. A focus detection method using an image pickup element including a first photoelectric conversion element and a second photoelectric conversion element which share a lens, the method comprising the steps of:
performing a photoelectric conversion of images passing through different exit pupils of an image pickup optical system and outputting a focus detection signal used for focusing by a phase difference detection method by using the first photoelectric conversion element and the second photoelectric conversion element;
performing a correlation calculation by using a signal value obtained from the first photoelectric conversion element and the second photoelectric conversion element respectively and calculating an image shift amount;

calculating a defocus amount by multiplying the image shift amount by a coefficient; and correcting the coefficient in accordance with the signal value obtained from at least one of the first photoelectric conversion element and the second photoelectric conversion element; and determining a maximum value of the plurality of signal values obtained from at least one of the plurality of first photoelectric conversion elements and the plurality of second photoelectric conversion elements in a focus detection area, wherein the coefficient is, when the signal value obtained from at least one of the first photoelectric conversion element and the second photoelectric conversion element is greater than a predetermined value, corrected so that the coefficient increases, compared with a case where the signal value is less than or equal to the predetermined value, and wherein the coefficient is corrected so that the coefficient increases as the maximum value is increased.

10. A focus detection apparatus which includes an image pickup element having a first photoelectric conversion element and a second photoelectric conversion element which share a lens, wherein the first photoelectric conversion element and the second photoelectric conversion element perform a photoelectric conversion of images passing through different exit pupils of an image pickup optical system so as to output a focus detection signal used for focusing by a phase difference detection method, the focus detection apparatus comprising:

a processor performing a correlation calculation by using each of signal values obtained from the first photoelectric conversion element and the second photoelectric conversion element respectively, and calculating an image shift amount;

the processor performing a calculation of a defocus amount by multiplying the image shift amount by a coefficient; and the processor performing correction of the coefficient in accordance with the signal value obtained from at least one of the first photoelectric conversion element and the second photoelectric conversion element;

the processor determining a maximum value of the plurality of signal values obtained from at least one of the plurality of first photoelectric conversion elements and the plurality of second photoelectric conversion elements in a focus detection area, wherein the processor corrects, when an accumulation value based on the plurality of signal values obtained from at least one of the plurality of first photoelectric conversion elements and the plurality of second photoelectric conversion elements in a focus detection area is greater than a predetermined value, the coefficient so that the coefficient increases, compared with a case where the accumulation value is less than or equal to the predetermined value, and wherein the processor corrects the coefficient so that the coefficient increases as the maximum value is increased.

11. The focus detection apparatus according to claim 10, wherein the processor corrects the coefficient so that the coefficient increases as an accumulation value based on the plurality of signal values obtained from at least one of the plurality of first photoelectric conversion elements and the plurality of second photoelectric conversion elements in a focus detection area is increased.

12. The focus detection apparatus according to claim 11, wherein the processor determines whether or not the plurality of signal values obtained from at least one of the plurality of first photoelectric conversion elements and the plurality of second photoelectric conversion elements are not less than a predetermined value, and wherein the processor calculates the accumulation value by adding a value based on a signal value not less than the predetermined value of the plurality of signal values.

13. The focus detection apparatus according to claim 12, wherein the processor calculates the accumulation value by adding a value obtained by subtracting the predetermined value from the signal value not less than the predetermined value.

14. The focus detection apparatus according to claim 11, wherein the processor calculates a correction coefficient by using a value obtained by multiplying the accumulation value by a predetermined ratio.

15. The focus detection apparatus according to claim 10, wherein the processor performs an in-focus determination based on an absolute value of the defocus amount, and wherein the processor determines an in-focus state when a sign of the defocus amount is reversed from a sign of a last defocus amount.

16. An image pickup apparatus comprising:

a focus detection apparatus according to claim 10; and an image processor configured to process an image signal obtained by using an addition signal of the first photoelectric conversion element and the second photoelectric conversion element.

17. An image pickup system comprising:

an image pickup optical system; and an image pickup apparatus according to claim 16, configured to obtain an optical image via the image pickup optical system.

18. The image pickup system according to claim 17, wherein the first photoelectric conversion element and the second photoelectric conversion element are configured to receive a pair of light beams passing through different regions of an exit pupil of the image pickup optical system.

19. A focus detection apparatus which includes an image pickup element having a first photoelectric conversion element and a second photoelectric conversion element which share a lens, wherein the first photoelectric conversion element and the second photoelectric conversion element perform a photoelectric conversion of images passing through different exit pupils of an image pickup optical system so as to output a focus detection signal used for focusing by a phase difference detection method, the focus detection apparatus comprising:

a processor performing a correlation calculation by using each of signal values obtained from the first photoelectric conversion element and the second photoelectric conversion element respectively, and calculating an image shift amount;

the processor performing a calculation of a defocus amount by multiplying the image shift amount by a coefficient;

the processor performing a correction of the coefficient in accordance with the signal value obtained from at least one of the first photoelectric conversion element and the second photoelectric conversion element;

the processor determining whether or not the plurality of signal values obtained from at least one of the plurality of first photoelectric conversion elements and the plurality of second photoelectric conversion elements in a focus detection area are not less than a predetermined value; and the processor determining a maximum value of the plurality of signal values obtained from at least one of the plurality of first photoelectric conversion elements and the plurality of second photoelectric conversion elements in the focus detection area, wherein the processor calculates the number of pixels indicating a signal value not less than the predetermined value, wherein the processor corrects, when the number of pixels is greater than a predetermined value, the coefficient so that the coefficient increases, compared with a case where the number of pixels is less than or equal to the predetermined value, and wherein the processor corrects the coefficient so that the coefficient increases as the maximum value is increased.

20. The focus detection apparatus according to claim 19, wherein the processor performs an in-focus determination based on an absolute value of the defocus amount, wherein the processor determines an in-focus state when a sign of the defocus amount is reversed from a sign of a last defocus amount.

21. An image pickup apparatus comprising:
a focus detection apparatus according to claim 19; and
an image processor configured to process an image signal obtained by using an addition signal of the first photoelectric conversion element and the second photoelectric conversion element.

22. An image pickup system comprising:
an image pickup optical system; and
an image pickup apparatus according to claim 21, configured to obtain an optical image via the image pickup optical system.

23. The image pickup system according to claim 22,
wherein the first photoelectric conversion element and the second photoelectric conversion element are configured to receive a pair of light beams passing through different regions of an exit pupil of the image pickup optical system.

24. A focus detection method using an image pickup element including a first photoelectric conversion element and a second photoelectric conversion element which share a lens, the method comprising the steps of:

performing a photoelectric conversion of images passing through different exit pupils of an image pickup optical system and outputting a focus detection signal used for focusing by a phase difference detection method by using the first photoelectric conversion element and the second photoelectric conversion element;

performing a correlation calculation by using a signal value obtained from the first photoelectric conversion element and the second photoelectric conversion element respectively and calculating an image shift amount;

calculating a defocus amount by multiplying the image shift amount by a coefficient;

correcting the coefficient in accordance with the signal value obtained from at least one of the first photoelectric conversion element and the second photoelectric conversion element; and determining a maximum value of the plurality of signal values obtained from at least one of the plurality of first photoelectric conversion elements and the plurality of second photoelectric conversion elements in a focus detection area, wherein the coefficient is, when an accumulation value based on the plurality of signal values obtained from at least one of the plurality of first photoelectric conversion elements and the plurality of second photoelectric conversion elements in a focus detection area is greater than a predetermined value, corrected so that the coefficient increases, compared with a case where the accumulation value is less than or equal to the predetermined value, and wherein the coefficient is corrected so that the coefficient increases as the maximum value is increased.

25. A focus detection method using an image pickup element including a first photoelectric conversion element and a second photoelectric conversion element which share a lens, the method comprising the steps of:

performing a photoelectric conversion of images passing through different exit pupils of an image pickup optical system and outputting a focus detection signal used for focusing by a phase difference detection method by using the first photoelectric conversion element and the second photoelectric conversion element;

performing a correlation calculation by using a signal value obtained from the first photoelectric conversion element and the second photoelectric conversion element respectively and calculating an image shift amount;

calculating a defocus amount by multiplying the image shift amount by a coefficient;

correcting the coefficient in accordance with the signal value obtained from at least one of the first photoelectric conversion element and the second photoelectric conversion element;

determining whether or not the plurality of signal values obtained from at least one of the plurality of first photoelectric conversion elements and the plurality of second photoelectric conversion elements in a focus detection area are not less than a predetermined value; and determining a maximum value of the plurality of signal values obtained from at least one of the plurality of first photoelectric conversion elements and the plurality of second photoelectric conversion elements in a focus detection area, wherein the number of pixels indicating a signal value not less than the predetermined value is calculated, wherein the coefficient is, when the number of pixels is greater than a predetermined value, corrected so that the coefficient increases, compared with a case where the number of pixels is less than or equal to the predetermined value, and wherein the coefficient is corrected so that the coefficient increases as the maximum value is increased.

26. A focus detection apparatus which includes an image pickup element having a first photoelectric conversion element and a second photoelectric conversion element which share a lens, wherein the first photoelectric conversion element and the second photoelectric conversion element perform a photoelectric conversion of images passing through different exit pupils of an image pickup optical system so as to output a focus detection signal used for focusing by a phase difference detection method, the focus detection apparatus comprising:

a processor performing a correlation calculation by using each of signal values obtained from the first photoelectric conversion element and the second photoelectric conversion element respectively, and calculating an image shift amount;

the processor performing a calculation of a defocus amount by multiplying the image shift amount by a coefficient;

the processor correcting the coefficient in accordance with the signal value obtained from at least one of the first photoelectric conversion element and the second photoelectric conversion element;

the processor determining whether or not the plurality of signal values obtained from at least one of the plurality of first photoelectric conversion elements and the plurality of second photoelectric conversion elements in a focus detection area are not less than a predetermined value; and the processor determining a maximum value of the plurality of signal values obtained from at least one of the plurality of first photoelectric conversion elements and the plurality of second photoelectric conversion elements in the focus detection area, wherein the processor calculates an accumulation value by adding a value based on a signal value not less than the predetermined value of the plurality of signal values, and calculates the number of pixels indicating the signal value not less than the predetermined value, wherein the processor corrects, when an average value of the accumulation value and the number of pixels is greater than a predetermined value, the coefficient so that the coefficient increases, compared with the average value is less than or equal to the predetermined value, and wherein the processor corrects the coefficient so that the coefficient increases as the maximum value is increased.

27. The focus detection apparatus according to claim 26, wherein the processor an in-focus determination based on an absolute value of the defocus amount, wherein the processor determines an in-focus state when a sign of the defocus amount is reversed from a sign of a last defocus amount.

28. A focus detection method using an image pickup element including a first photoelectric conversion element and a second photoelectric conversion element which share a lens, the method comprising the steps of:

performing a photoelectric conversion of images passing through different exit pupils of an image pickup optical system and outputting a focus detection signal used for focusing by a phase difference detection method by using the first photoelectric conversion element and the second photoelectric conversion element;

performing a correlation calculation by using a signal value obtained from the first photoelectric conversion element and the second photoelectric conversion element respectively and calculating an image shift amount;

calculating a defocus amount by multiplying the image shift amount by a coefficient;

correcting the coefficient in accordance with the signal value obtained from at least one of the first photoelectric conversion element and the second photoelectric conversion element;

determining whether or not the plurality of signal values obtained from at least one of the plurality of first photoelectric conversion elements and the plurality of second photoelectric conversion elements in a focus detection area are not less than a predetermined value; and determining a maximum value of the plurality of signal values obtained from at least one of the plurality of first photoelectric conversion elements and the plurality of second photoelectric conversion elements in a focus detection area, wherein an accumulation value by adding a value based on a signal value not less than the predetermined value of the plurality of signal values is calculated, and the number of pixels indicating the signal value not less than the predetermined value is calculated;

wherein the coefficient is, when an average value of the accumulation value and the number of pixels is greater than a predetermined value, corrected so that the coefficient increases, compared with the average value is less than or equal to the predetermined value, and wherein the coefficient is corrected so that the coefficient increases as the maximum value is increased.

29. An image pickup apparatus comprising:
a focus detection apparatus according to claim 26; and
an image processor configured to process an image signal obtained by using an addition signal of the first photoelectric conversion element and the second photoelectric conversion element.

30. An image pickup system comprising:
an image pickup optical system; and
an image pickup apparatus according to claim 29, configured to obtain an optical image via the image pickup optical system.

31. The image pickup system according to claim 30, wherein the first photoelectric conversion element and the second photoelectric conversion element are configured to receive a pair of light beams passing through different regions of an exit pupil of the image pickup optical system.

32. A focus detection apparatus which includes an image pickup element having a first photoelectric conversion element and a second photoelectric conversion element which share a lens, wherein the first photoelectric conversion element and the second photoelectric conversion element perform a photoelectric conversion of images passing through different exit pupils of an image pickup optical system so as to output a focus detection signal used for focusing by a phase difference detection method, the focus detection apparatus comprising:

a processor performing a correlation calculation by using each of signal values obtained from the first photoelectric conversion element and the second photoelectric conversion element respectively, and calculating an image shift amount;

the processor performing a calculation of a defocus amount by multiplying the image shift amount by a coefficient;

the processor performing correction of the coefficient in accordance with the signal value obtained from at least one of the first photoelectric conversion element and the second photoelectric conversion element; and the processor performing an in-focus determination based on an absolute value of the defocus amount, wherein the processor corrects, when the signal value obtained from at least one of the first photoelectric conversion element and the second photoelectric conversion element is greater than a predetermined value, the coefficient so that the coefficient increases, compared with a case where the signal value is less than or equal to the predetermined value, and wherein the processor determines an in-focus state when a lens drive direction is reversed from a direction of a last lens drive direction.

33. A focus detection method using an image pickup element including a first photoelectric conversion element and a second photoelectric conversion element which share a lens, the method comprising the steps of:

performing a photoelectric conversion of images passing through different exit pupils of an image pickup optical system and outputting a focus detection signal used for focusing by a phase difference detection method by using the first photoelectric conversion element and the second photoelectric conversion element;

performing a correlation calculation by using a signal value obtained from the first photoelectric conversion element and the second photoelectric conversion element respectively and calculating an image shift amount;
calculating a defocus amount by multiplying the image shift amount by a coefficient;
correcting the coefficient in accordance with the signal value obtained from at least one of the first photoelectric conversion element and the second photoelectric conversion element; and
performing an in-focus determination based on an absolute value of the defocus amount,
wherein the coefficient is, when the signal value obtained from at least one of the first photoelectric conversion element and the second photoelectric conversion element is greater than a predetermined value, corrected so that the coefficient increases, compared with a case where the signal value is less than or equal to the predetermined value, and
wherein an in-focus state is determined when a lens drive direction is reversed from a direction of a last lens drive direction.

34. A focus detection apparatus which includes an image pickup element having a first photoelectric conversion element and a second photoelectric conversion element which share a lens, wherein the first photoelectric conversion element and the second photoelectric conversion element perform a photoelectric conversion of images passing through different exit pupils of an image pickup optical system so as to output a focus detection signal used for focusing by a phase difference detection method, the focus detection apparatus comprising:
   a processor performing a correlation calculation by using each of signal values obtained from the first photoelectric conversion element and the second photoelectric conversion element respectively, and calculating an image shift amount;
   the processor performing a calculation of a defocus amount by multiplying the image shift amount by a coefficient;
   the processor performing correction of the coefficient in accordance with the signal value obtained from at least one of the first photoelectric conversion element and the second photoelectric conversion element; and
   the processor performing an in-focus determination based on an absolute value of the defocus amount,
   wherein the processor corrects, when an accumulation value based on the plurality of signal values obtained from at least one of the plurality of first photoelectric conversion elements and the plurality of second photoelectric conversion elements in a focus detection area is greater than a predetermined value, the coefficient so that the coefficient increases, compared with a case where the accumulation value is less than or equal to the predetermined value, and
   wherein the processor determines an in-focus state when a lens drive direction is reversed from a direction of a last lens drive direction.

35. A focus detection apparatus which includes an image pickup element having a first photoelectric conversion element and a second photoelectric conversion element which share a lens, wherein the first photoelectric conversion element and the second photoelectric conversion element perform a photoelectric conversion of images passing through different exit pupils of an image pickup optical system so as to output a focus detection signal used for focusing by a phase difference detection method, the focus detection apparatus comprising:
   a processor performing a correlation calculation by using each of signal values obtained from the first photoelectric conversion element and the second photoelectric conversion element respectively, and calculating an image shift amount;
   the processor performing a calculation of a defocus amount by multiplying the image shift amount by a coefficient;
   the processor performing a correction of the coefficient in accordance with the signal value obtained from at least one of the first photoelectric conversion element and the second photoelectric conversion element;
   the processor determining whether or not the plurality of signal values obtained from at least one of the plurality of first photoelectric conversion elements and the plurality of second photoelectric conversion elements in a focus detection area are not less than a predetermined value; and
   the processor performing an in-focus determination based on an absolute value of the defocus amount,
   wherein the processor calculates the number of pixels indicating a signal value not less than the predetermined value,
   wherein the processor corrects, when the number of pixels is greater than a predetermined value, the coefficient so that the coefficient increases, compared with a case where the number of pixels is less than or equal to the predetermined value, and
   wherein the processor determines an in-focus state when a lens drive direction is reversed from a direction of a last lens drive direction.

36. A focus detection apparatus which includes an image pickup element having a first photoelectric conversion element and a second photoelectric conversion element which share a lens, wherein the first photoelectric conversion element and the second photoelectric conversion element perform a photoelectric conversion of images passing through different exit pupils of an image pickup optical system so as to output a focus detection signal used for focusing by a phase difference detection method, the focus detection apparatus comprising:
   a processor performing a correlation calculation by using each of signal values obtained from the first photoelectric conversion element and the second photoelectric conversion element respectively, and calculating an image shift amount;
   the processor performing a calculation of a defocus amount by multiplying the image shift amount by a coefficient;
   the processor correcting the coefficient in accordance with the signal value obtained from at least one of the first photoelectric conversion element and the second photoelectric conversion element;
   the processor determining whether or not the plurality of signal values obtained from at least one of the plurality of first photoelectric conversion elements and the plurality of second photoelectric conversion elements in a focus detection area are not less than a predetermined value; and
   the processor performing an in-focus determination based on an absolute value of the defocus amount,
   wherein the processor calculates an accumulation value by adding a value based on a signal value not less than the predetermined value of the plurality of signal values, and calculates the number of pixels indicating the signal value not less than the predetermined value,
   wherein the processor corrects, when an average value of the accumulation value and the number of pixels is greater than a predetermined value, the coefficient so that the coefficient increases, compared with the average value is less than or equal to the predetermined value, and wherein the processor determines an in-focus state when a lens drive direction is reversed from a direction of a last lens drive direction.

37. A focus detection method using an image pickup element including a first photoelectric conversion element and a second photoelectric conversion element which share a lens, the method comprising the steps of:

performing a photoelectric conversion of images passing through different exit pupils of an image pickup optical system and outputting a focus detection signal used for focusing by a phase difference detection method by using the first photoelectric conversion element and the second photoelectric conversion element;

performing a correlation calculation by using a signal value obtained from the first photoelectric conversion element and the second photoelectric conversion element respectively and calculating an image shift amount;

calculating a defocus amount by multiplying the image shift amount by a coefficient;

correcting the coefficient in accordance with the signal value obtained from at least one of the first photoelectric conversion element and the second photoelectric conversion element; and performing an in-focus determination based on an absolute value of the defocus amount, wherein the coefficient is, when an accumulation value based on the plurality of signal values obtained from at least one of the plurality of first photoelectric conversion elements and the plurality of second photoelectric conversion elements in a focus detection area is greater than a predetermined value, corrected so that the coefficient increases, compared with a case where the accumulation value is less than or equal to the predetermined value, and wherein an in-focus state is determined when a lens drive direction is reversed from a direction of a last lens drive direction.

38. A focus detection method using an image pickup element including a first photoelectric conversion element and a second photoelectric conversion element which share a lens, the method comprising the steps of:

performing a photoelectric conversion of images passing through different exit pupils of an image pickup optical system and outputting a focus detection signal used for focusing by a phase difference detection method by using the first photoelectric conversion element and the second photoelectric conversion element;

performing a correlation calculation by using a signal value obtained from the first photoelectric conversion element and the second photoelectric conversion element respectively and calculating an image shift amount;

calculating a defocus amount by multiplying the image shift amount by a coefficient;

correcting the coefficient in accordance with the signal value obtained from at least one of the first photoelectric conversion element and the second photoelectric conversion element;

determining whether or not the plurality of signal values obtained from at least one of the plurality of first photoelectric conversion elements and the plurality of second photoelectric conversion elements in a focus detection area are not less than a predetermined value; and performing an in-focus determination based on an absolute value of the defocus amount, wherein the number of pixels indicating a signal value not less than the predetermined value is calculated, wherein the coefficient is, when the number of pixels is greater than a predetermined value, corrected so that the coefficient increases, compared with a case where the number of pixels is less than or equal to the predetermined value, and wherein an in-focus state is determined when a lens drive direction is reversed from a direction of a last lens drive direction.

39. A focus detection method using an image pickup element including a first photoelectric conversion element and a second photoelectric conversion element which share a lens, the method comprising the steps of:

performing a photoelectric conversion of images passing through different exit pupils of an image pickup optical system and outputting a focus detection signal used for focusing by a phase difference detection method by using the first photoelectric conversion element and the second photoelectric conversion element;

performing a correlation calculation by using a signal value obtained from the first photoelectric conversion element and the second photoelectric conversion element respectively and calculating an image shift amount;

calculating a defocus amount by multiplying the image shift amount by a coefficient;

correcting the coefficient in accordance with the signal value obtained from at least one of the first photoelectric conversion element and the second photoelectric conversion element;

determining whether or not the plurality of signal values obtained from at least one of the plurality of first photoelectric conversion elements and the plurality of second photoelectric conversion elements in a focus detection area are not less than a predetermined value; and performing an in-focus determination based on an absolute value of the defocus amount, wherein an accumulation value by adding a value based on a signal value not less than the predetermined value of the plurality of signal values is calculated, and the number of pixels indicating the signal value not less than the predetermined value is calculated, wherein the coefficient is, when an average value of the accumulation value and the number of pixels is greater than a predetermined value, corrected so that the coefficient increases, compared with the average value is less than or equal to the predetermined value, and wherein an in-focus state is determined when a lens drive direction is reversed from a direction of a last lens drive direction.

* * * * *